US00RE50333E

(19) United States
(12) Reissued Patent
Minnette et al.

(10) Patent Number: US RE50,333 E
(45) Date of Reissued Patent: Mar. 11, 2025

(54) PACKAGE

(71) Applicant: Berry Global, Inc., Evansville, IN (US)

(72) Inventors: Jeffrey C. Minnette, Evansville, IN (US); Eric W. Kost, Evansville, IN (US)

(73) Assignee: Berry Global, Inc., Evansville, IN (US)

(21) Appl. No.: 17/575,098

(22) Filed: Jan. 13, 2022

Related U.S. Patent Documents

Reissue of:
(64) Patent No.: 10,532,872
Issued: Jan. 14, 2020
Appl. No.: 14/952,103
Filed: Nov. 25, 2015

U.S. Applications:
(60) Provisional application No. 62/089,074, filed on Dec. 8, 2014.

(51) Int. Cl.

| | |
|---|---|
| ***B65D 77/20*** | (2006.01) |
| ***B65D 3/06*** | (2006.01) |
| ***B65D 3/30*** | (2006.01) |
| ***B65D 43/02*** | (2006.01) |

(52) U.S. Cl.
CPC ..... *B65D 77/2032* (2013.01); *B65D 3/06* (2013.01); *B65D 3/30* (2013.01); *B65D 43/02* (2013.01); *B65D 2577/2083* (2013.01)

(58) Field of Classification Search
CPC ..... B65D 77/2032; B65D 3/06; B65D 3/30; B65D 2577/2083
See application file for complete search history.

(56) References Cited

U.S. PATENT DOCUMENTS

| | | | | |
|---|---|---|---|---|
| 1,824,907 | A | 8/1929 | Lermer | |
| 2,196,206 | A | 3/1936 | Foss | |
| 2,277,066 | A | 2/1938 | Bogner | |
| 2,123,723 | A * | 7/1938 | Furrer | B65D 57/00 229/162.1 |
| 2,422,239 | A | 6/1947 | Holt | |
| 3,051,580 | A | 12/1958 | Brennan | |
| 2,941,710 | A * | 6/1960 | Smith | B65D 7/28 229/199 |
| 2,982,440 | A | 5/1961 | Harrison | |
| 3,410,939 | A | 3/1965 | Driza et al. | |
| 3,428,238 | A | 2/1969 | Sherlby et al. | |
| 3,434,652 | A | 3/1969 | Shore | |
| 3,447,714 | A | 6/1969 | Elliot | |
| 3,452,896 | A | 7/1969 | Elliot | |
| 3,452,921 | A | 7/1969 | Donovan | |
| 3,463,350 | A | 8/1969 | Unger | |
| 3,471,075 | A | 10/1969 | Wolf | |
| 3,685,685 | A | 8/1972 | Phillips | |
| 3,753,512 | A | 8/1973 | Curry | |
| 3,787,547 | A | 1/1974 | Marco | |

(Continued)

OTHER PUBLICATIONS

International Search Report dated Jun. 6, 2013, relating to International Application No. PCT/US2013/033153.

(Continued)

*Primary Examiner* — Terrence R Till

(57) ABSTRACT

A package includes a lid and a container. The lid is adapted to mate with a brim of the container to close a top opening arranged to open into an interior product-storage region formed in the container.

11 Claims, 21 Drawing Sheets

(56) References Cited

U.S. PATENT DOCUMENTS 3,870,188 A 3/1975 Buffett
3,923,190 A 12/1975 Roth
3,952,677 A 4/1976 Hartman et al.
3,956,550 A 5/1976 Sutch
3,977,153 A 8/1976 Schrenk
4,040,461 A * 8/1977 Carson ..... B65D 7/18 206/515
4,120,932 A 10/1978 Roth
4,154,345 A 5/1979 Davis et al.
4,210,674 A 7/1980 Mitchell
4,215,797 A 8/1980 Chen
4,270,475 A 6/1981 Fletcher
4,284,671 A 8/1981 Cancio et al.
4,292,355 A 9/1981 Bonis
4,398,648 A 8/1983 Cerny et al.
4,446,969 A 5/1984 Tyler
4,526,290 A 7/1985 Cerny
4,542,029 A 9/1985 Caner et al.
4,641,005 A 2/1987 Seiferth
4,685,273 A 8/1987 Caner et al.
4,753,351 A 6/1988 Guillin
4,794,008 A 12/1988 Schmidt et al.
4,809,876 A 3/1989 Tomaswick et al.
4,859,822 A 8/1989 Ragusa et al.
4,880,129 A 11/1989 McHenry et al.
4,883,190 A 11/1989 Thomas
4,900,163 A 2/1990 Mack
4,913,307 A 4/1990 Takata et al.
4,925,684 A 5/1990 Simon
4,927,677 A 5/1990 Kasai
4,948,006 A 8/1990 Okabe
4,959,446 A 9/1990 Davis et al.
4,964,205 A 10/1990 Coffman
4,982,872 A * 1/1991 Avery ..... B65D 25/14 220/62.13
4,988,841 A 1/1991 Pesheck et al.
5,035,344 A 7/1991 Christopher
5,039,001 A 8/1991 Kinigakis et al.
5,045,369 A 9/1991 Kobayashi et al.
5,048,977 A 9/1991 Robbins, III
5,096,306 A 3/1992 Perrson et al.
5,098,751 A 3/1992 Tamura et al.
5,165,568 A 11/1992 Wischusen, III
5,176,284 A 1/1993 Sorensen
5,176,314 A 1/1993 Akazawa et al.
5,217,737 A 6/1993 Gygax et al.
5,236,102 A 8/1993 Quittmann et al.
5,257,709 A 11/1993 Okabe et al.
5,277,310 A * 1/1994 Mertz ..... B65D 5/5028 206/320
5,360,649 A 11/1994 Sato et al.
5,428,943 A 7/1995 Balcombe
5,429,833 A 7/1995 Wyslotsky
5,445,292 A 8/1995 Slomski et al.
5,482,179 A 1/1996 Bruhn
5,705,239 A 1/1998 Andersen et al.
5,772,332 A 6/1998 Geller
5,782,376 A 7/1998 Brauner et al.
5,843,501 A 12/1998 Rubin et al.
5,928,741 A 7/1999 Andersen et al.
5,971,259 A 10/1999 Bacon
6,022,913 A 2/2000 Tanaka et al.
6,032,819 A 3/2000 Hanna
6,065,628 A 5/2000 Page
6,077,578 A 6/2000 Valyi
6,082,571 A * 7/2000 Avery ..... B65D 25/54 220/9.1
6,138,854 A 10/2000 Kaneko et al.
6,158,608 A 12/2000 Schlattl
6,170,696 B1 1/2001 Tucker et al.
6,189,744 B1 2/2001 Prince
6,231,237 B1 5/2001 Geller ..... B65D 75/008 383/122
6,257,401 B1 7/2001 Mangla et al.
6,279,505 B1 8/2001 Plester et al.
6,296,137 B1 10/2001 Bjørnsen
6,305,546 B1 10/2001 Saunders et al.
6,320,172 B1 11/2001 Watkins
6,325,213 B1 12/2001 Landis
6,363,695 B1 4/2002 Mykkänen
6,375,023 B1 4/2002 Lecinski et al.
6,390,323 B1 5/2002 Alticosalian
6,399,170 B1 6/2002 Hock et al.
6,413,466 B1 7/2002 Boyd et al.
6,460,714 B1 10/2002 Silvers et al.
6,460,720 B1 10/2002 Massey et al.
6,513,703 B2 2/2003 Becker
6,521,158 B2 2/2003 Ichikawa et al.
6,544,613 B1 * 4/2003 Varadarajan ..... B65D 77/2032 220/359.3
6,554,154 B1 4/2003 Chauhan et al.
6,588,654 B2 7/2003 Nakashima
6,627,278 B1 9/2003 Sandstrom et al.
6,648,164 B1 11/2003 DeCola et al.
6,651,874 B1 11/2003 Pedersen
6,672,473 B2 1/2004 Torniainen et al.
6,673,403 B1 1/2004 Shiiki et al.
6,682,764 B1 1/2004 Morris et al.
6,685,049 B1 2/2004 Paladino
6,699,543 B1 3/2004 Agarwal
6,712,232 B2 3/2004 Tanaka et al.
6,718,664 B2 4/2004 Williams
6,722,518 B1 4/2004 Bartz
6,729,494 B2 5/2004 Portman et al.
6,729,495 B2 5/2004 Gardiner
6,763,962 B1 7/2004 Wang
6,763,968 B1 7/2004 Boyd et al.
6,808,753 B2 10/2004 Rule et al.
6,811,826 B2 11/2004 Rule et al.
6,868,980 B2 3/2005 Schultz et al.
6,870,145 B2 3/2005 Watkins
6,874,650 B2 4/2005 Welsh et al.
6,881,286 B2 4/2005 Drummond et al.
6,905,769 B2 6/2005 Komada
6,910,599 B2 6/2005 Tucker et al.
6,919,135 B2 7/2005 Kasahara
6,949,275 B2 9/2005 Johansson
6,960,316 B2 11/2005 Brown et al.
7,000,801 B2 2/2006 Rodriguez
7,004,345 B2 2/2006 Turner et al.
7,017,773 B2 3/2006 Gruber et al.
7,022,955 B2 4/2006 Watkins
7,090,880 B1 8/2006 Droste et al.
7,097,063 B2 8/2006 Tucker et al.
7,097,066 B2 8/2006 Tucker et al.
7,108,441 B2 * 9/2006 Altonen ..... B65D 83/206 220/9.1
7,112,356 B2 9/2006 Nomula et al.
7,118,800 B2 10/2006 Shirane et al.
7,122,234 B2 10/2006 Olofsson et al.
7,128,233 B2 10/2006 Hogan
7,131,289 B2 11/2006 Harl et al.
7,137,524 B2 11/2006 Nomula
7,137,525 B2 11/2006 Gibney
7,178,687 B1 2/2007 Manderfield et al.
7,195,803 B2 3/2007 Andersson et al.
7,198,168 B2 4/2007 Mizuma
7,204,056 B2 4/2007 Sieverding
7,216,769 B2 5/2007 Palder
7,246,714 B2 7/2007 Garg et al.
7,261,219 B2 8/2007 Tucker et al.
7,284,673 B2 10/2007 Habeger et al.
7,306,852 B2 12/2007 Komada
7,337,916 B2 3/2008 Clougherty
7,370,788 B1 5/2008 Otani et al.
7,371,455 B2 5/2008 Shirane et al.
7,437,990 B2 10/2008 Duch
7,458,480 B2 12/2008 Nguyen
7,458,500 B2 12/2008 Whitaker et al.
7,475,787 B2 1/2009 Gruver et al.
7,476,428 B2 1/2009 Bürki et al.
7,543,705 B2 6/2009 Yourist
7,543,713 B2 6/2009 Trude et al.

(56) References Cited

U.S. PATENT DOCUMENTS

| | | | |
|---|---|---|---|
| 7,549,540 | B2 | 6/2009 | Lee et al. |
| 7,552,841 | B2 | 6/2009 | Hollis et al. |
| 7,556,168 | B2 | 7/2009 | Turner et al. |
| 7,563,495 | B2 | 7/2009 | Anelli |
| 7,568,590 | B1 | 8/2009 | Gross et al. |
| 7,571,827 | B2 | 8/2009 | Haley et al. |
| 7,584,866 | B2 | 9/2009 | Selina et al. |
| 7,631,777 | B1 | 12/2009 | Bukowski |
| 7,644,823 | B2 | 1/2010 | Gelardi et al. |
| 7,644,833 | B2 | 1/2010 | Turner et al. |
| 7,651,651 | B2 | 1/2010 | Riffer |
| 7,665,601 | B2 | 2/2010 | Portier |
| 7,665,623 | B2 | 2/2010 | Emmerzaal |
| 7,681,732 | B2 | 3/2010 | Moehlenbrock et al. |
| 7,694,843 | B2 | 4/2010 | Hollis et al. |
| 7,699,216 | B2 | 4/2010 | Smith et al. |
| 7,726,483 | B2 | 6/2010 | Ramanujam et al. |
| 7,735,674 | B2 | 6/2010 | Cai |
| 7,748,553 | B2 | 7/2010 | Akiyama et al. |
| 7,757,885 | B2 | 7/2010 | Goeking et al. |
| 7,757,887 | B2 | 7/2010 | Gardiner |
| 7,766,168 | B2 | 8/2010 | Thrapp et al. |
| 7,766,178 | B2 | 8/2010 | Robinson et al. |
| 7,766,181 | B2 | 8/2010 | Fogle et al. |
| 7,789,262 | B2 | 9/2010 | Niederer et al. |
| 7,794,149 | B2 | 9/2010 | Wilkes |
| 7,799,400 | B2 | 9/2010 | Zihlmann |
| 7,823,737 | B2 | 11/2010 | Noll et al. |
| 7,824,749 | B2 | 11/2010 | Dawes |
| 7,861,881 | B2 | 1/2011 | Ali et al. |
| 7,862,318 | B2 | 1/2011 | Middleton et al. |
| 7,866,536 | B2 | 1/2011 | Calendrille |
| 7,874,453 | B2 | 1/2011 | Church |
| 7,874,476 | B2 | 1/2011 | D'Amato |
| 7,878,350 | B2 | 2/2011 | Ramoundos |
| 7,882,975 | B2 | 2/2011 | Kelly |
| 7,886,937 | B2 | 2/2011 | Py |
| 7,913,874 | B2 | 3/2011 | Gruskin et al. |
| 7,919,161 | B2 | 4/2011 | Ebner et al. |
| 7,922,021 | B2 | 4/2011 | Golden |
| 7,954,640 | B2 | 6/2011 | West et al. |
| 7,959,038 | B2 | 6/2011 | de Oliveira et al. |
| 7,963,419 | B2 | 6/2011 | Burney et al. |
| 7,980,403 | B2 | 7/2011 | Martinez |
| 7,980,404 | B2 | 7/2011 | Trude et al. |
| 7,984,807 | B2 | 7/2011 | Elliott |
| 8,002,170 | B2 | 8/2011 | Dixon-Garrett et al. |
| 8,038,023 | B2 | 10/2011 | Moore et al. |
| 8,113,368 | B2 | 2/2012 | Oguchi et al. |
| 8,733,572 | B2 | 5/2014 | Carmona |
| 2003/0000862 | A1 | 1/2003 | Matushek |
| 2003/0209556 | A1 | 11/2003 | Gruber |
| 2004/0060458 | A1 | 4/2004 | Janka |
| 2004/0185152 | A1 | 9/2004 | Garwood |
| 2004/0185154 | A1 | 9/2004 | Garwood |
| 2004/0185155 | A1 | 9/2004 | Garwood |
| 2004/0185156 | A1 | 9/2004 | Garwood |
| 2004/0232026 | A1 | 11/2004 | Goeking et al. |
| 2005/0017013 | A1 | 1/2005 | Peisach |
| 2005/0031814 | A1 | 2/2005 | Dawes |
| 2005/0074531 | A1 | 4/2005 | Patterson |
| 2005/0077297 | A1 | 4/2005 | Marshburn et al. ..... B65D 77/2032 220/359.2 |
| 2005/0084695 | A1 | 4/2005 | Shirane et al. |
| 2005/0158494 | A1 | 7/2005 | Koyama et al. |
| 2005/0175741 | A1 | 8/2005 | Reinders |
| 2005/0211713 | A1 | 9/2005 | Goeking et al. |
| 2005/0281494 | A1 | 12/2005 | Allen et al. |
| 2005/0284171 | A1 | 12/2005 | Harl et al. |
| 2006/0011635 | A1* | 1/2006 | Shibata ..... B65D 3/06 220/485 |
| 2006/0029757 | A1 | 2/2006 | Komada |
| 2006/0051463 | A1 | 3/2006 | Lopez |
| 2006/0131306 | A1 | 6/2006 | Shinogi |
| 2006/0175387 | A1* | 8/2006 | Yukumoto ..... B65D 77/2032 229/123.1 |
| 2006/0191940 | A1 | 8/2006 | Heyn |
| 2006/0201946 | A1 | 9/2006 | Witt |
| 2006/0204695 | A1 | 9/2006 | Shirane et al. |
| 2006/0269767 | A1 | 11/2006 | Sankey et al. |
| 2007/0267374 | A1 | 11/2007 | Middleton et al. |
| 2008/0078766 | A1 | 4/2008 | Oberholzer |
| 2008/0264939 | A1 | 10/2008 | Bray |
| 2009/0081336 | A1 | 3/2009 | Tuszkiewicz et al. |
| 2009/0110784 | A1 | 4/2009 | Yasumuro et al. |
| 2009/0302040 | A1 | 12/2009 | Fox et al. |
| 2010/0108693 | A1 | 5/2010 | Zhang et al. |
| 2010/0176134 | A1 | 7/2010 | Cramer |
| 2010/0237069 | A1 | 9/2010 | Helou et al. |
| 2010/0237083 | A1 | 9/2010 | Trude et al. |
| 2011/0049155 | A1 | 3/2011 | Levine |
| 2011/0052106 | A1 | 3/2011 | Holmes et al. |
| 2011/0253713 | A1 | 10/2011 | Ichikawa et al. |
| 2012/0199599 | A1 | 8/2012 | Minnette et al. |
| 2012/0298663 | A1 | 11/2012 | Seidel et al. |
| 2013/0024852 | A1 | 1/2013 | Firman et al. |
| 2013/0099414 | A1 | 4/2013 | Minnette |
| 2013/0104505 | A1 | 5/2013 | Minnette |
| 2013/0292394 | A1 | 11/2013 | Minnette et al. |
| 2014/0367296 | A1* | 12/2014 | Berger ..... B65D 77/0453 206/494 |

OTHER PUBLICATIONS

International Search Report and Written Opinion dated Jan. 20, 2016, relating to International Application No. PCT/US2015/062659.

International Preliminary Report on Patentability and Written Opinion for PCT App. No. PCT/2015/062659 dated May 30, 2017, BP-469 PCT II, 8 pages.

International Search Report and Written Opinion, Application No. PCT/US2015/062659, dated Feb. 12, 2016.

* cited by examiner

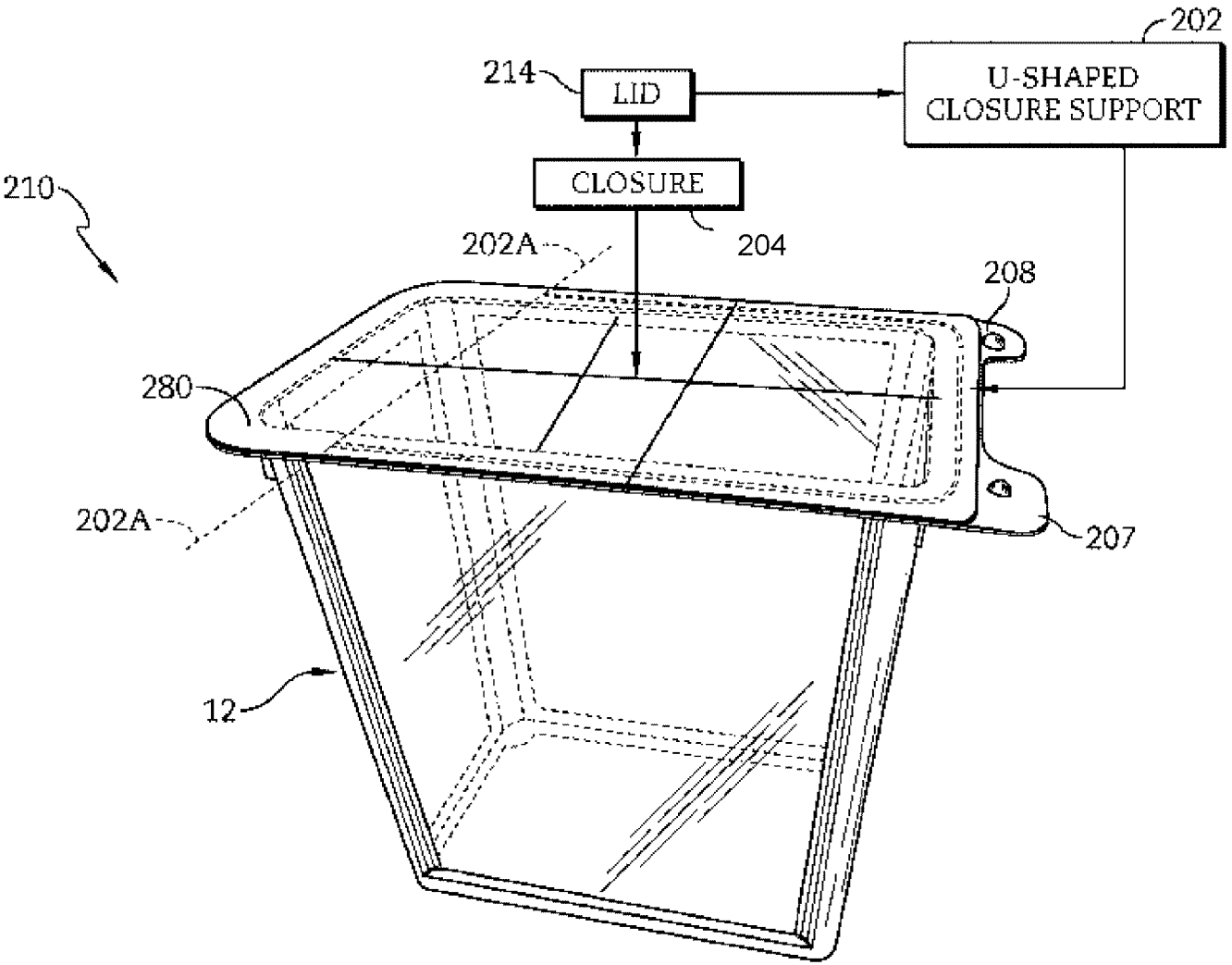
*FIG. 16*
(Amended)

PACKAGE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

PRIORITY CLAIM

This application claims priority under 35 U.S.C. § 119(e) to U.S. Provisional Application Ser. No. 62/089,074, filed Dec. 8, 2014, each of which is expressly incorporated by reference herein.

BACKGROUND

The present disclosure relates to a package, and in particular to a package made from plastics materials. More particularly, the present disclosure relates to a package that includes a container and a lid for the container.

SUMMARY

According to the present disclosure, a package includes a container and a lid. In illustrative embodiments, the container includes an interior casing comprising side and bottom film panels and a frame comprising a base section coupled to the bottom film panel to form a floor of the container, a brim arranged to lie above the base section, and several upright columns arranged to interconnect the base section and the brim and coupled to the side film panel to form a side wall of the container.

In illustrative embodiments, the frame is overmolded onto the side and bottom film panels that form the interior casing. The frame surrounds and rigidifies the interior casing. The interior casing is formed to provide an interior product-storage region of the container.

In illustrative embodiments, the interior casing is arranged to lie in an interior space bounded by the base section and four upright corner columns. A central portion of the bottom film panel is coupled to upwardly facing surfaces of the base section included in the container. A central portion of the side film panel is coupled to inwardly facing surfaces of the upright corner columns included in the container.

In illustrative embodiments, an upper end of the side film panel is flared outwardly so that an outer surface of that upper end faces downwardly to mate with the brim of the container and an inner surface of that upper end faces upwardly to mate with a lid that is configured to be mounted on the brim to close a top aperture opening into an interior product-storage region bounded by the interior casing.

In illustrative embodiments, an upwardly extending outer end of the bottom film panel is mated with a lower portion of the upright corner columns of the frame. A downwardly extending lower portion of the side film panel is arranged to lie in spaced-apart relation to the lower portion of the upright corner columns of the frame to trap the upwardly extending outer end of the bottom film panel therebetween so as to overlap with the upwardly extending outer end of the bottom film panel.

In illustrative embodiments, the lid of the package includes a pivotable U-shaped closure support appended to the brim to pivot about a horizontal pivot axis. The lid also includes a closure (e.g., film panel) coupled to upwardly facing surfaces of the brim and the pivotable U-shaped closure. The lid includes frangible connectors that are arranged to interconnect an outer edge of the brim and an inner edge of the U-shaped closure support. The first time a consumer opens the package, a pivot-inducing lifting force is applied to an underside of the U-shaped closure support to break the frangible connectors and separate a portion of the closure from a portion of the brim.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 1 is a perspective view of a first embodiment of a package in accordance with the present disclosure showing that the package comprises a lid and a container and showing that the container includes a frame and an interior casing coupled to an interior surface of the frame to establish a floor and a side wall of the container;

FIG. 1A is an exploded perspective assembly view of the package of FIG. 1 showing that the frame of the container is monolithic and comprises a rectangular base section, a rectangular brim, and four upright corner columns, and showing that the interior casing of the container comprises a bottom film panel adapted to be coupled to the base section of the frame to establish the floor of the container and an endless side film panel adapted to be coupled to the four upright corner columns to establish the side wall of the container;

Figure 1:
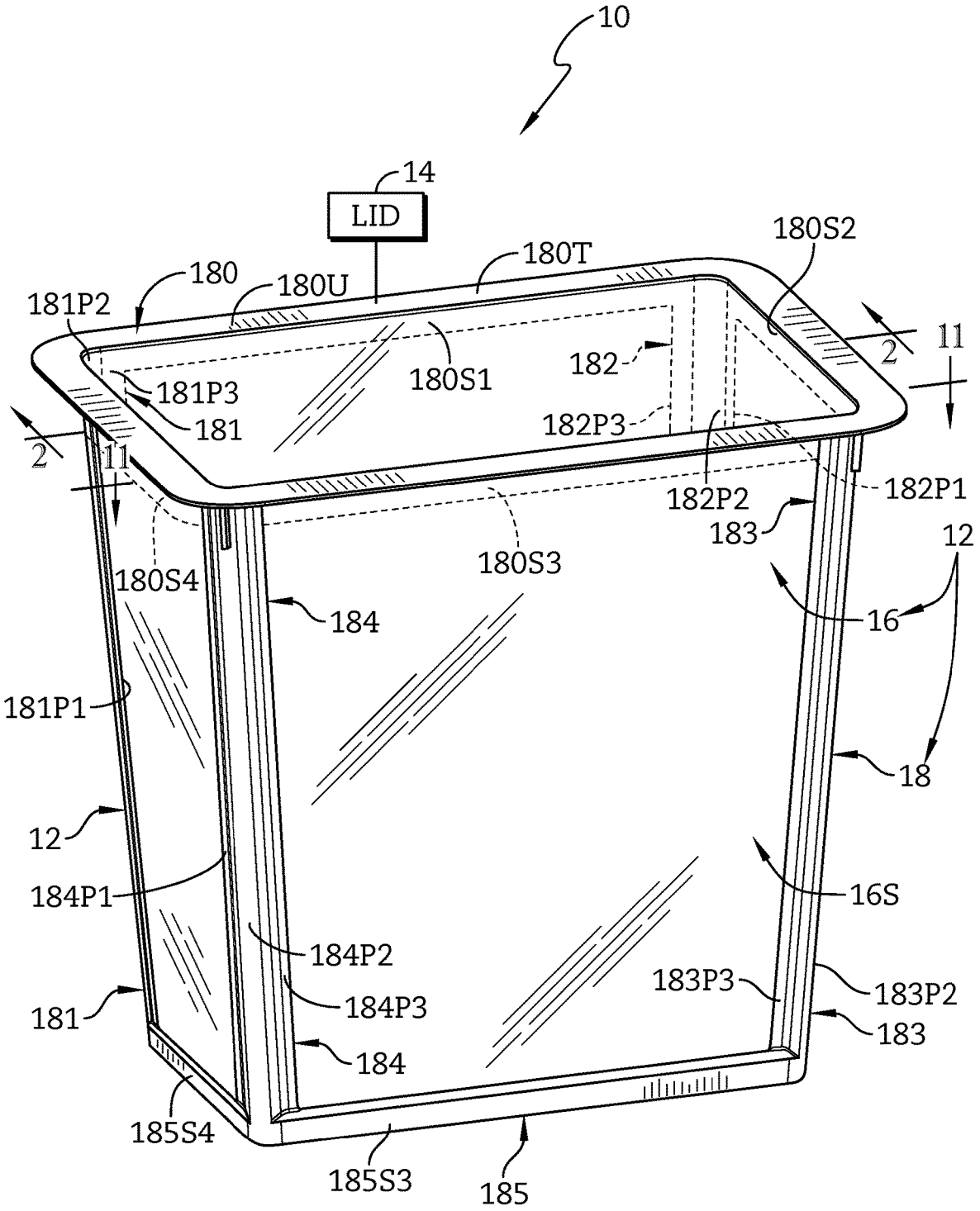
Figure 2:
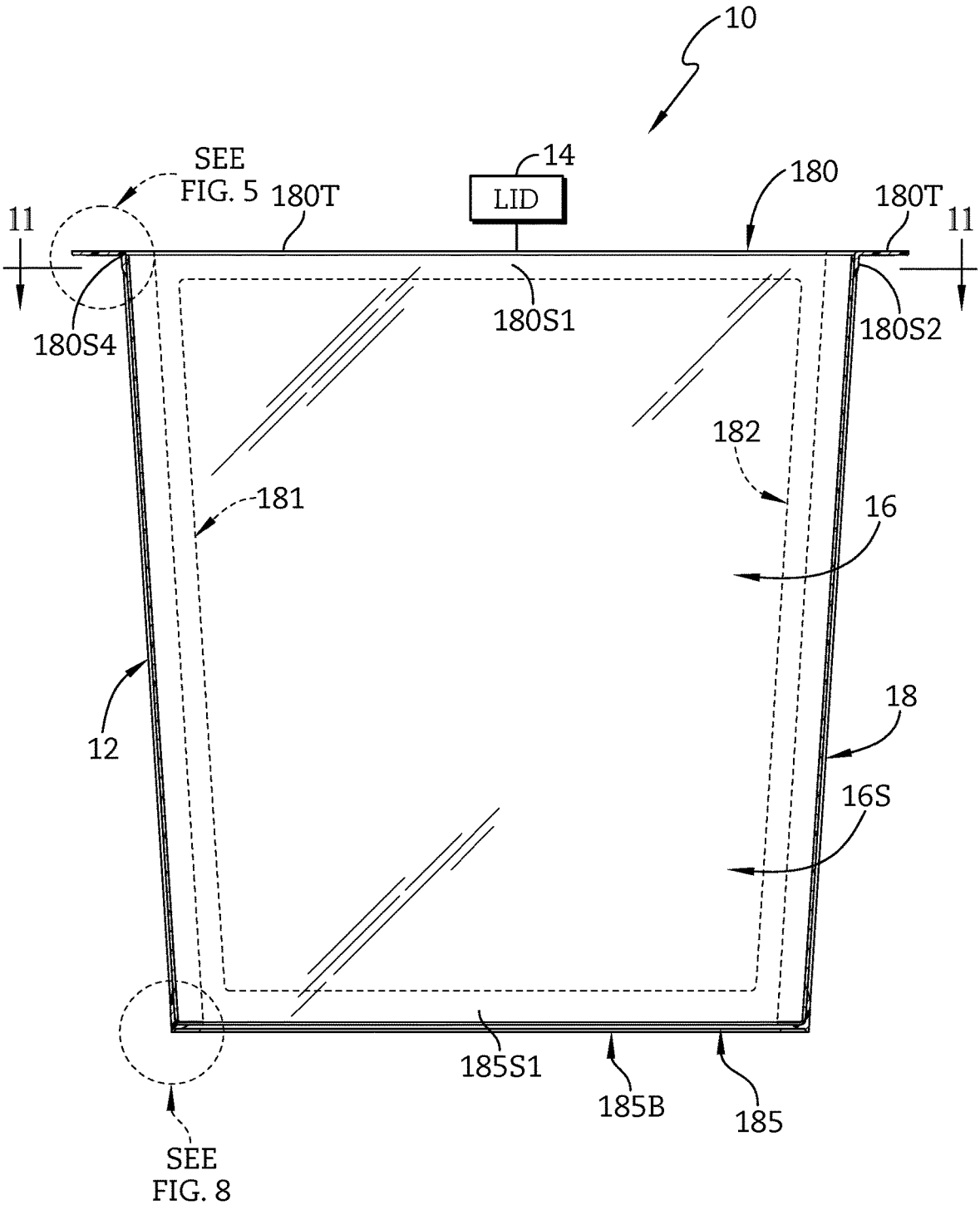
FIG. 2 is a sectional view taken along line 2-2 of FIG. 1.
Figure 3:
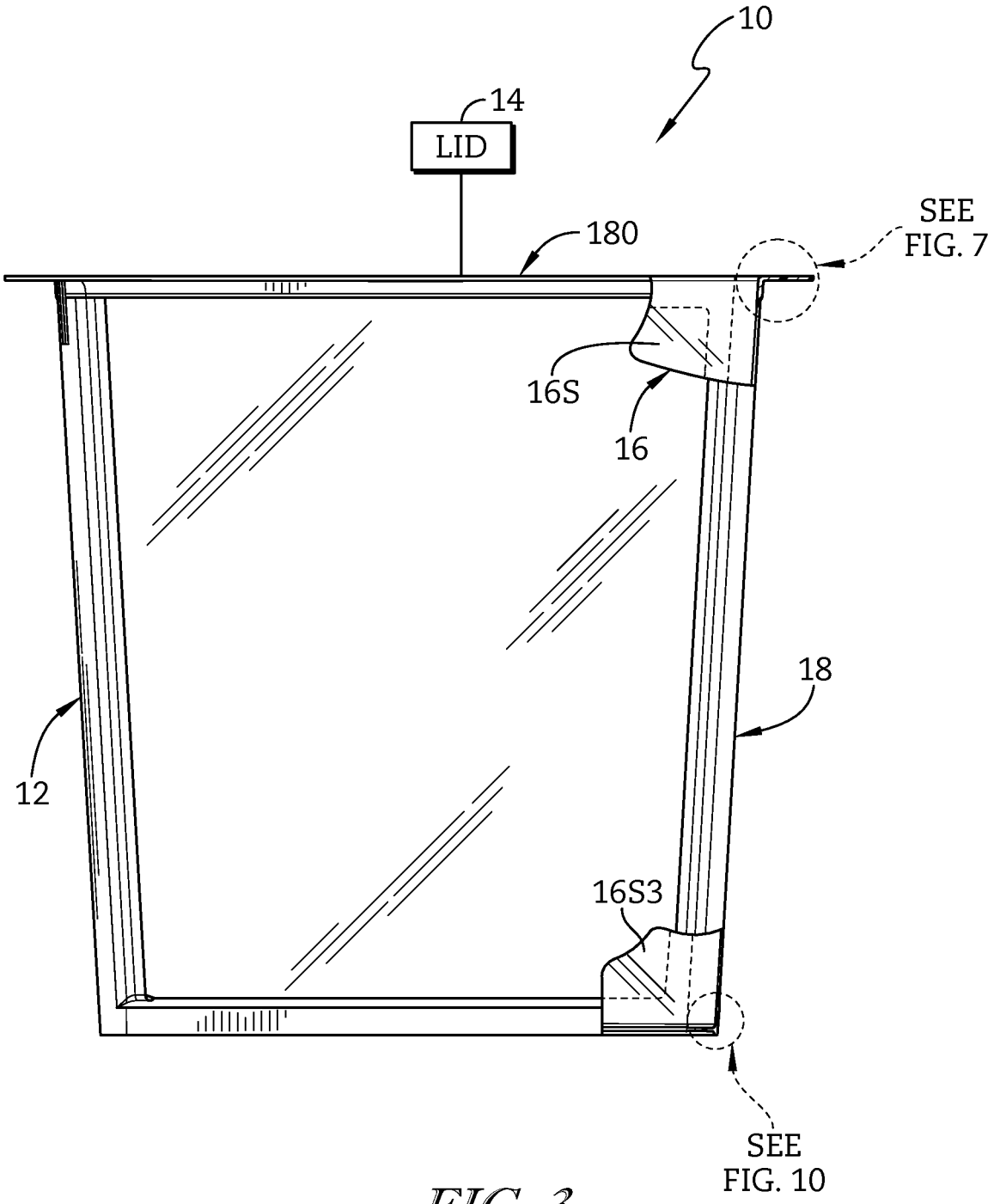
FIG. 3 is a side elevation view similar to FIG. 2 with portions broken away showing illustrative dimensions of the container of FIGS. 1 and 2.
Figure 4:
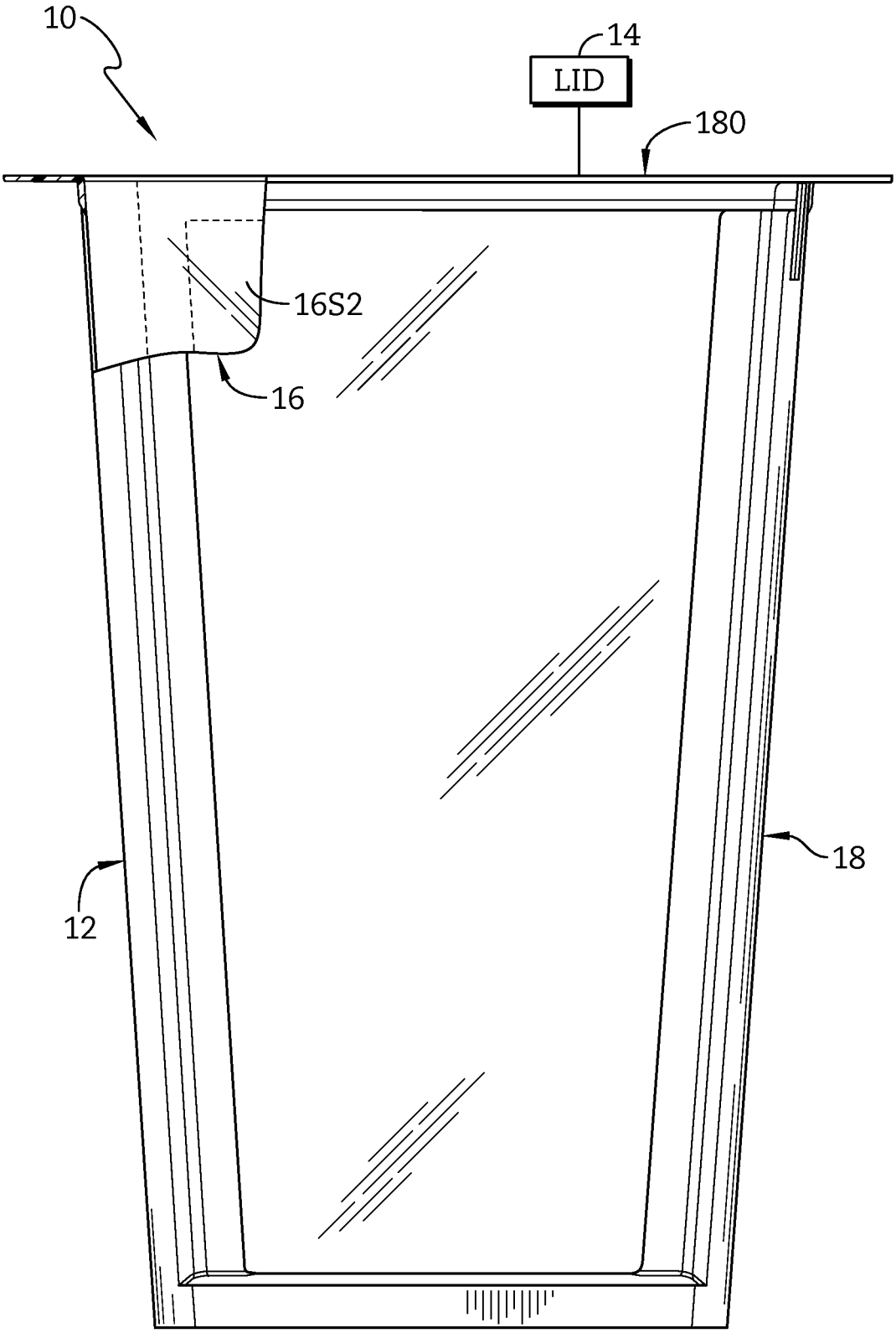
FIG. 4 is a right-side elevation view of the package of FIGS. 1-3 with a portion broken away showing additional illustrative dimensions of the container.
Figure 5:
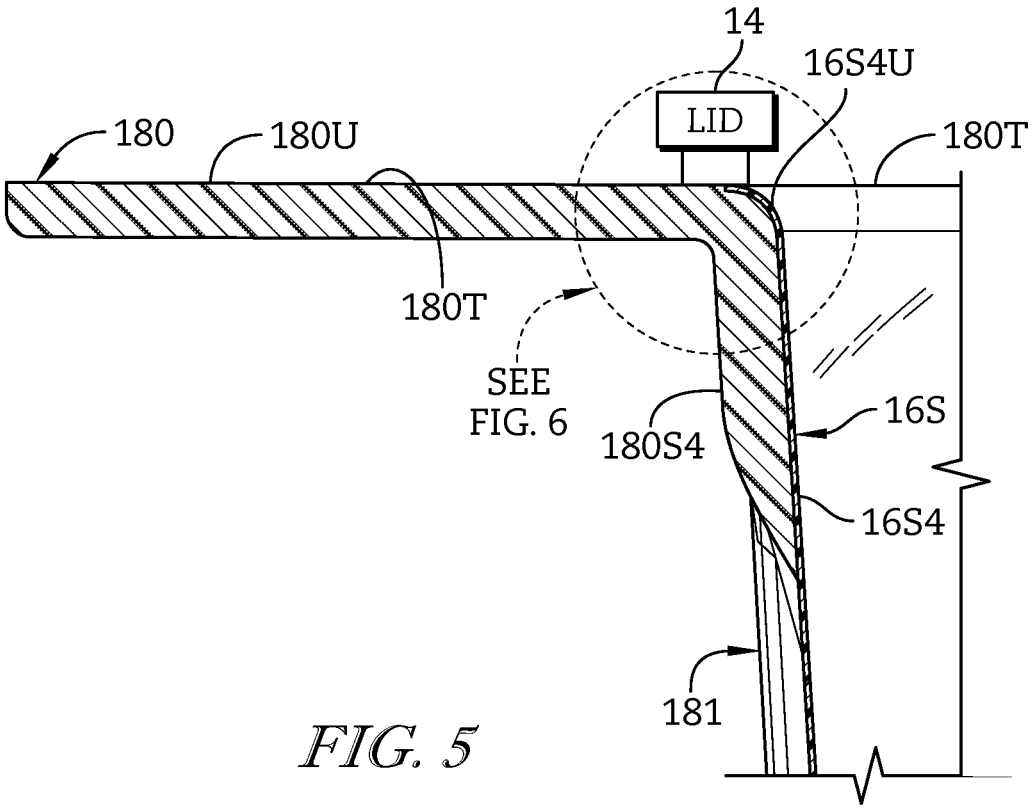
FIG. 5 is an enlarged view taken from a first circled region of FIG. 2.
Figure 6:
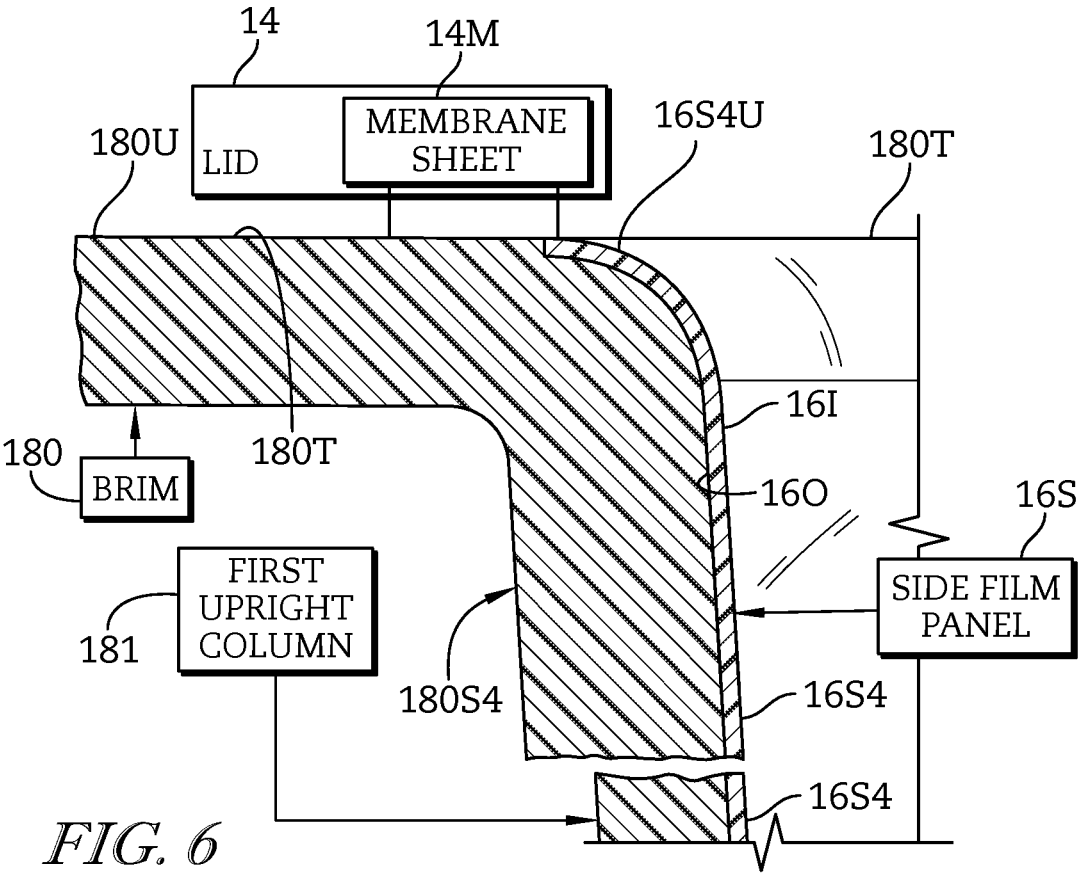
Figure 7:
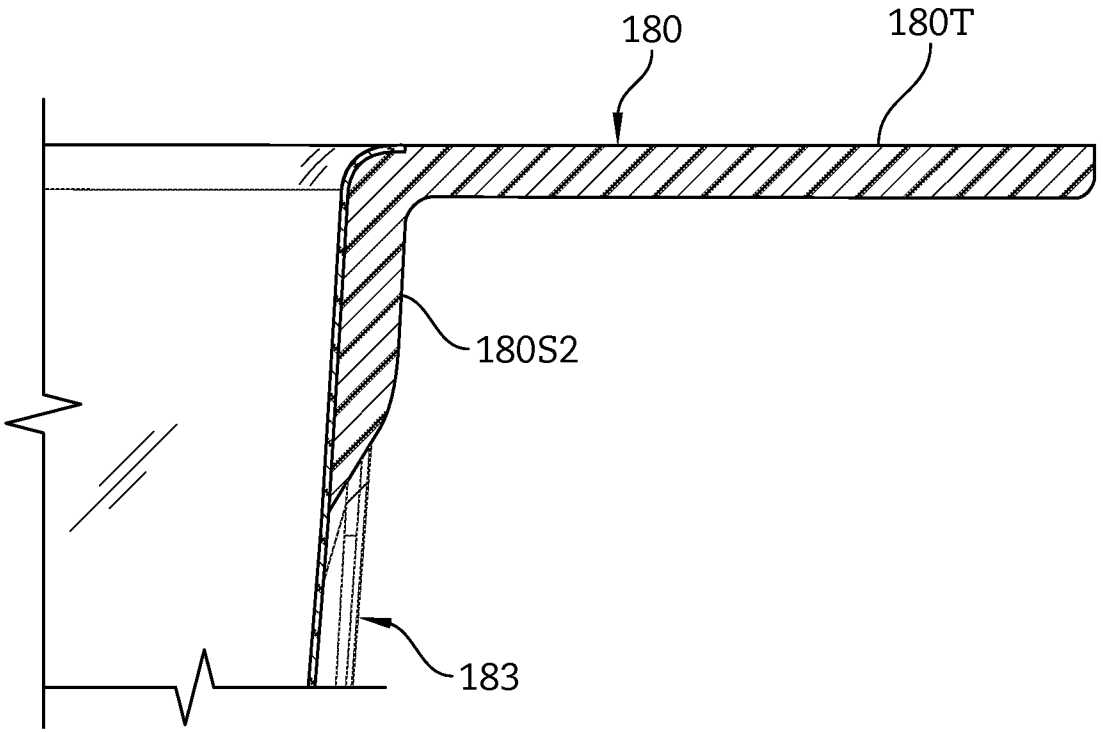
Figure 8:
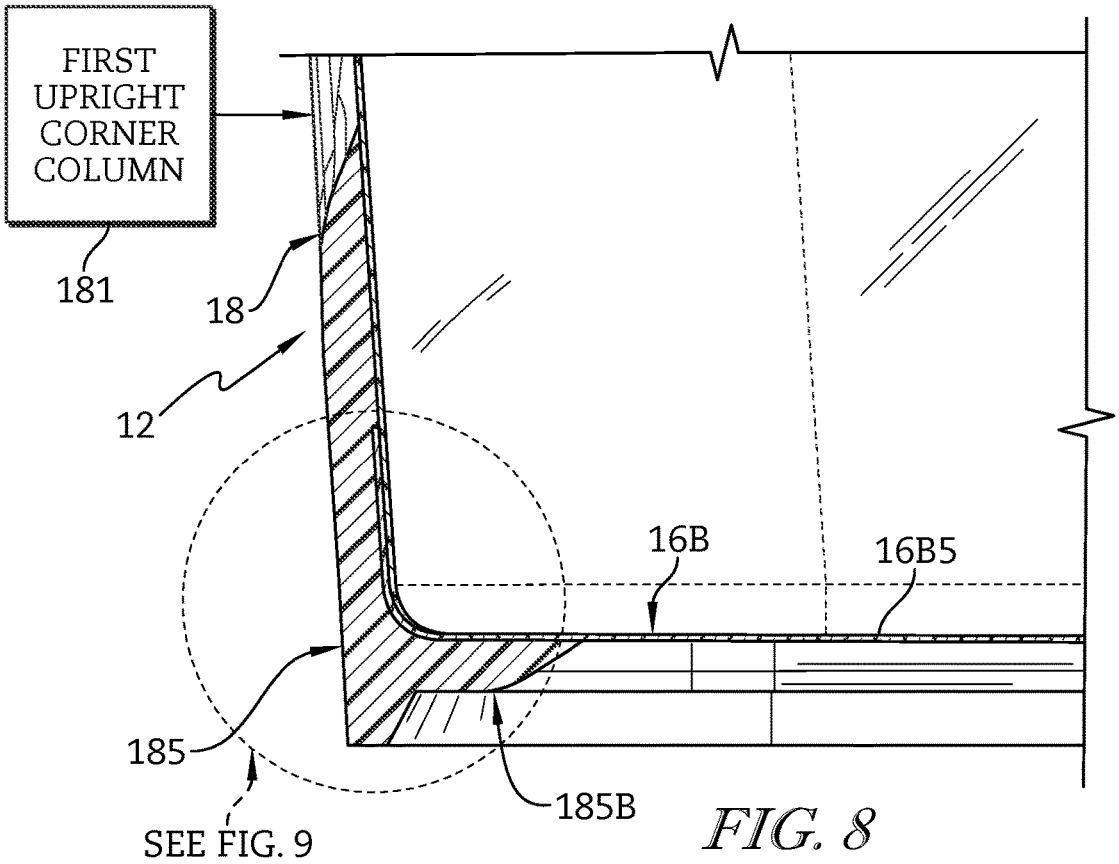
Figure 9:
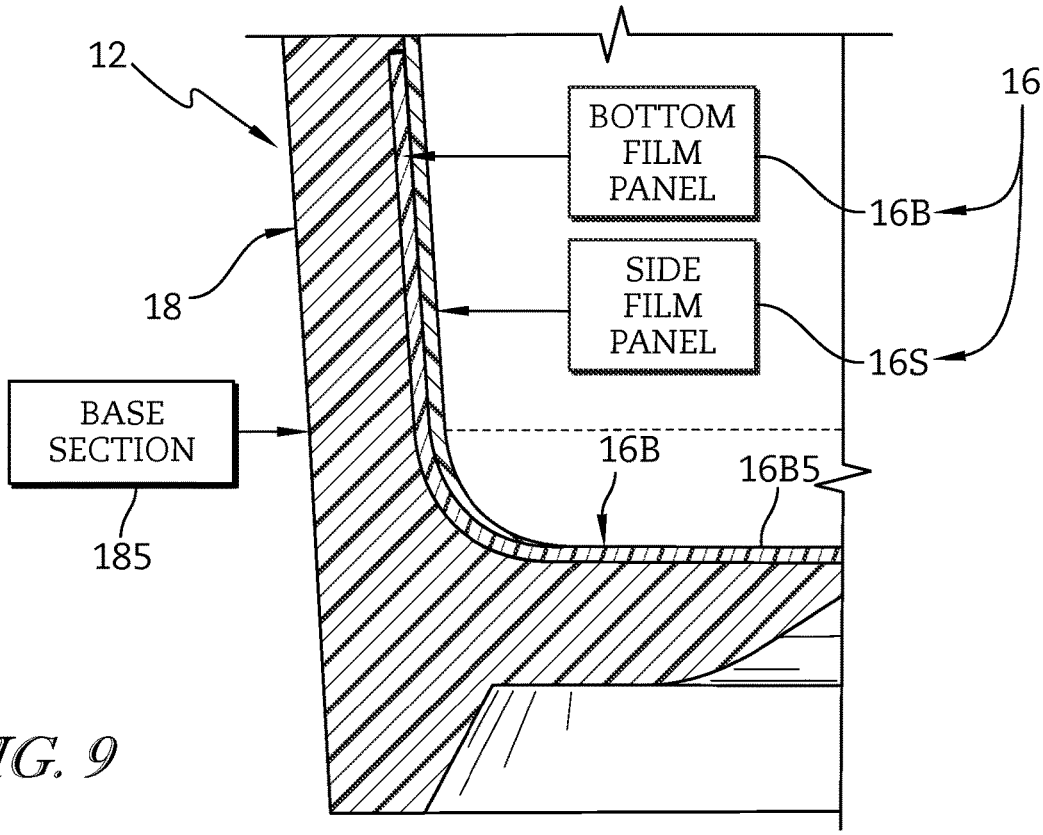
Figure 10:
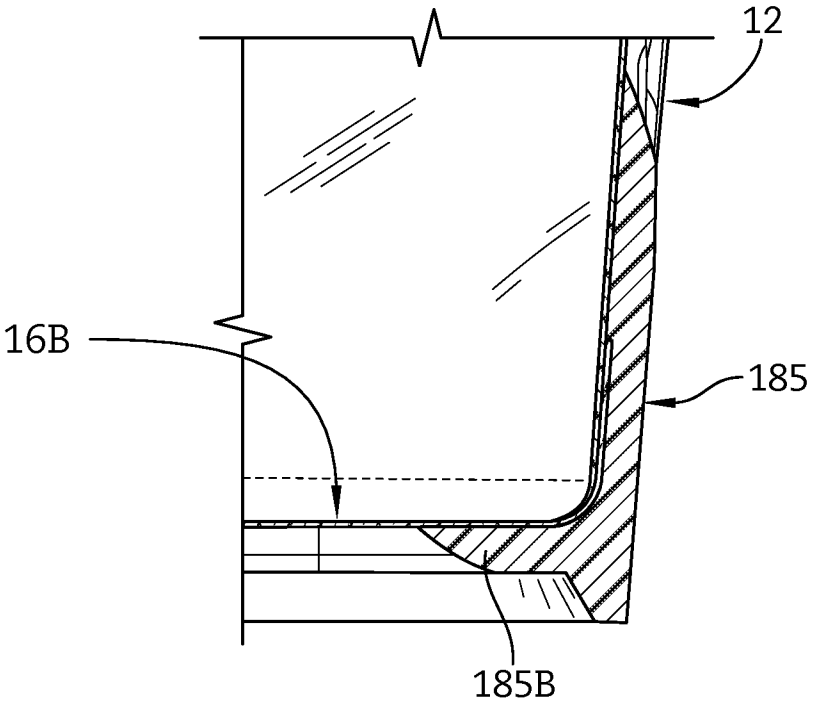
Figure 11:
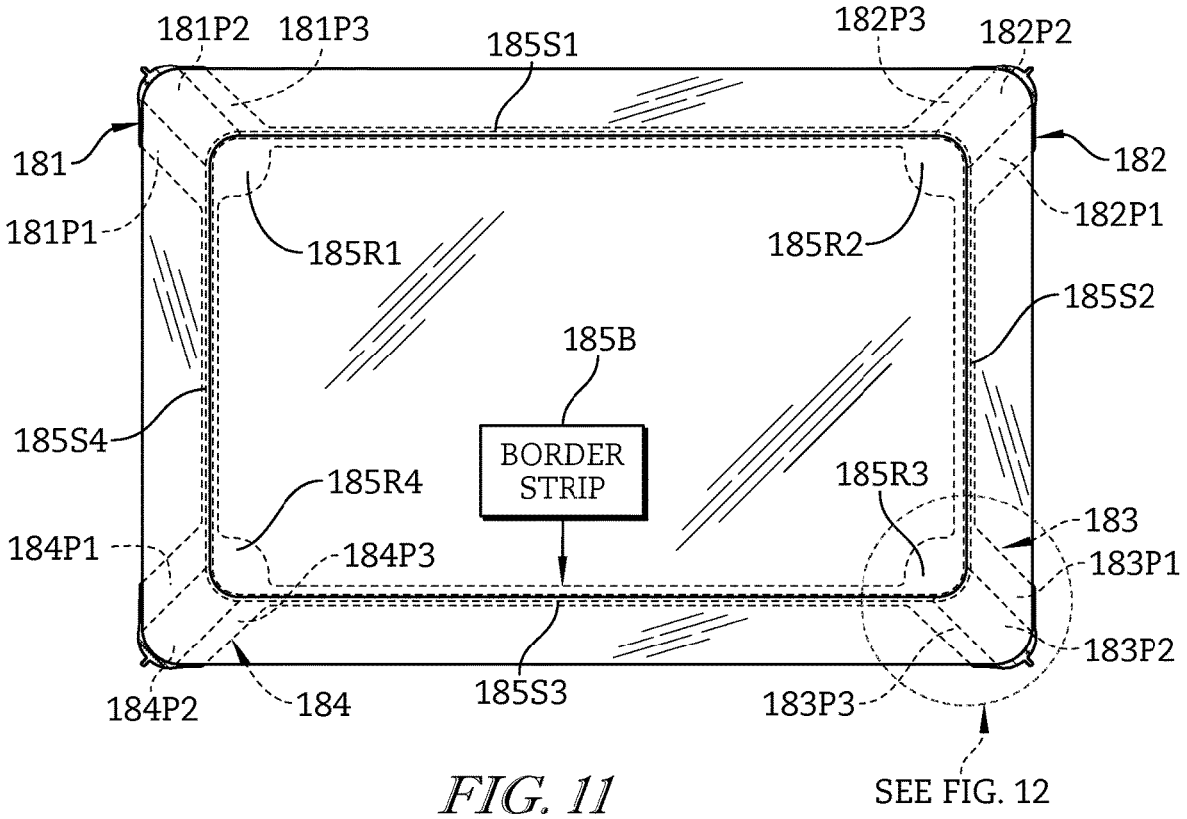
Figure 12:
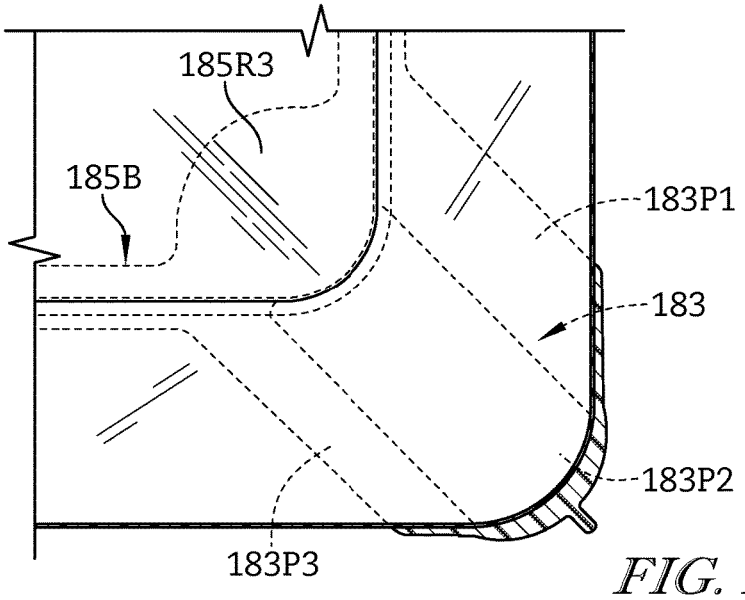
Figure 13:
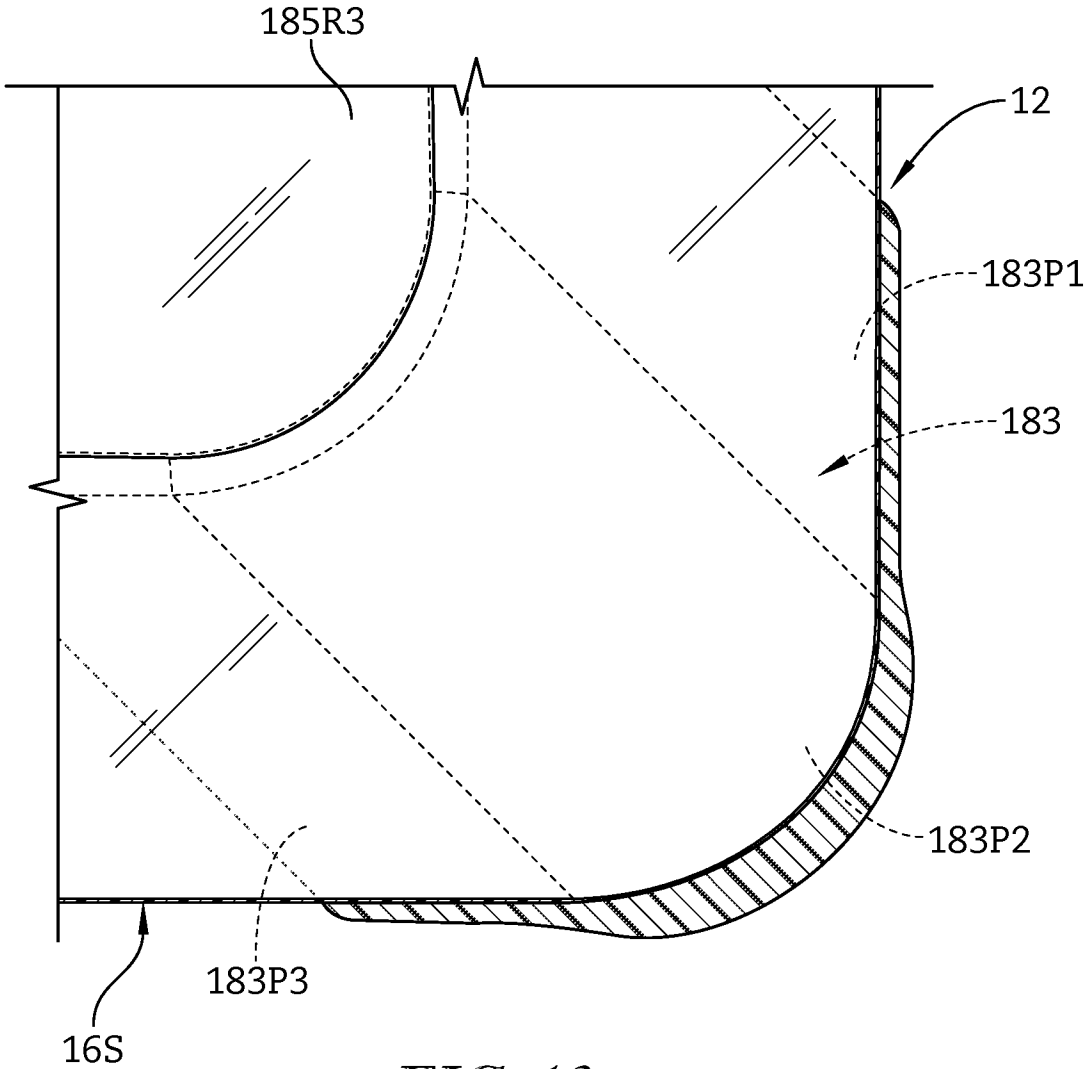
Figure 14:
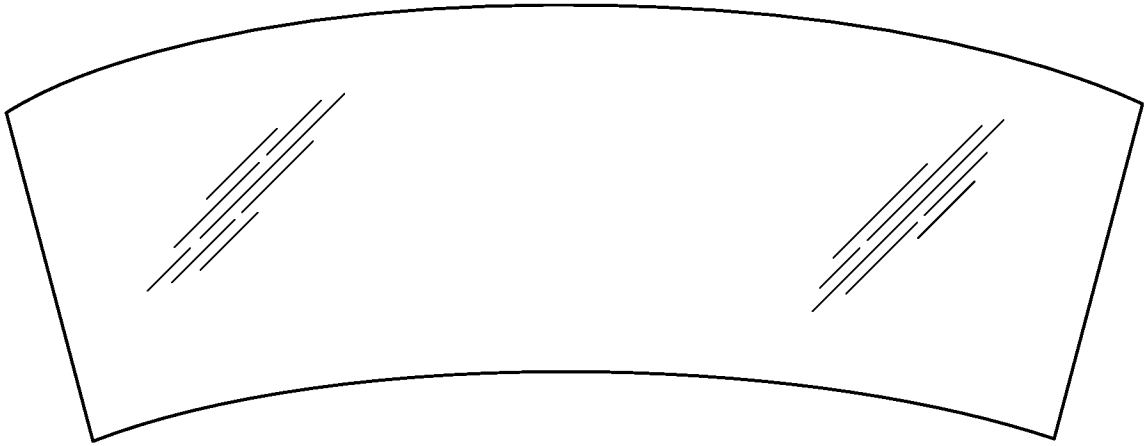
Figure 15:
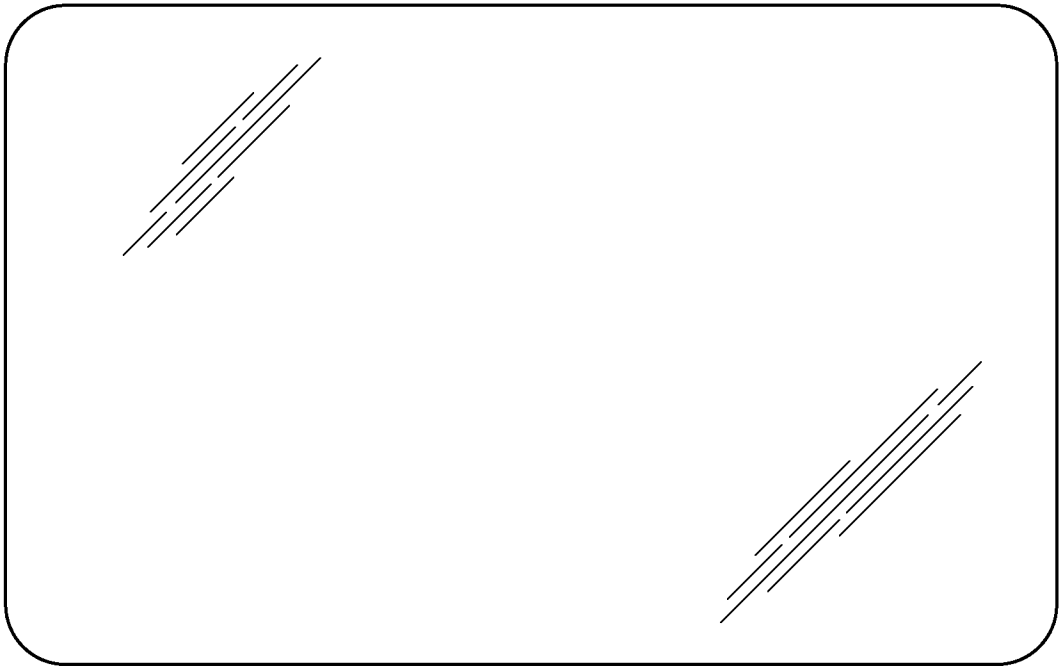
Figure 17:
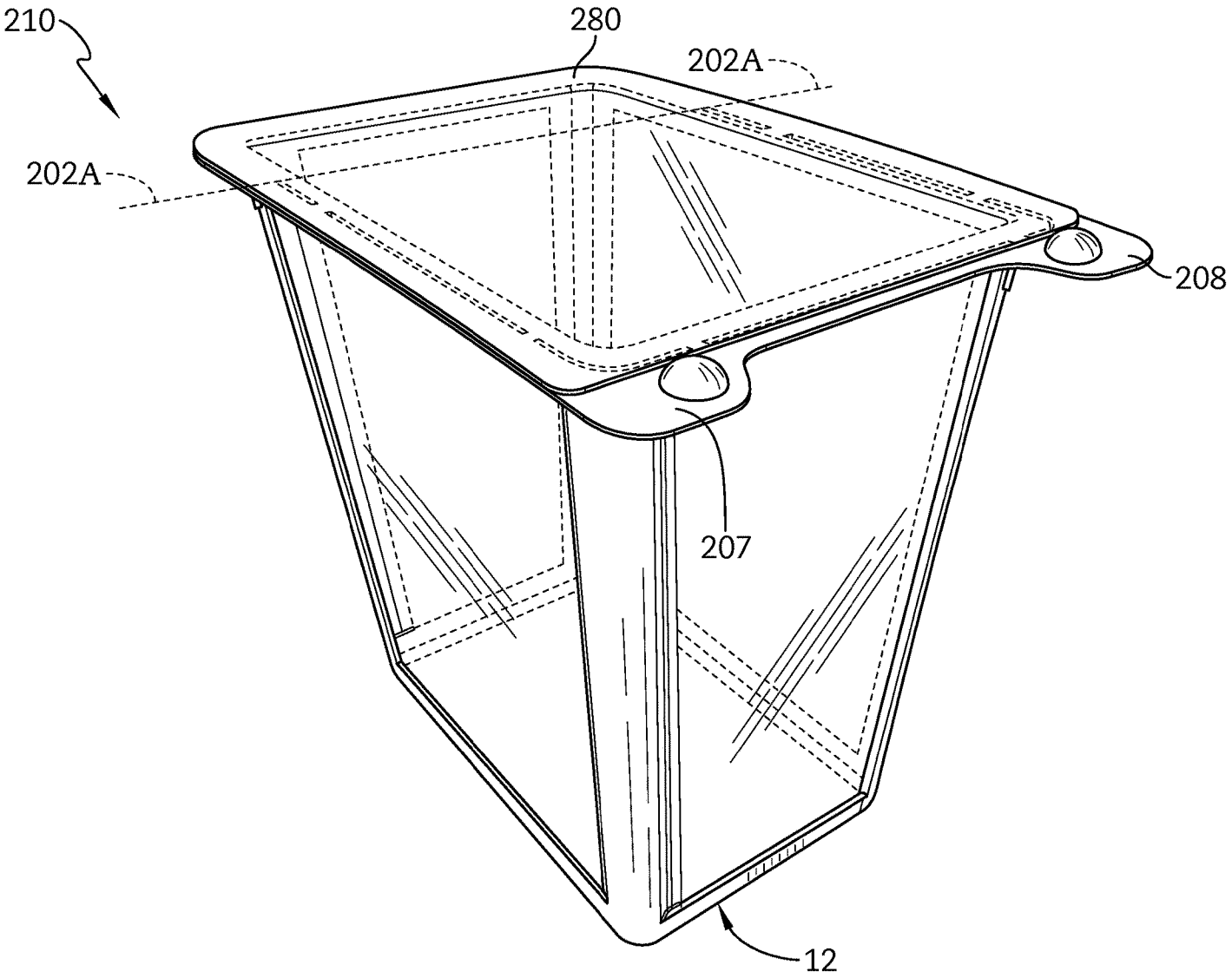
Figure 18:
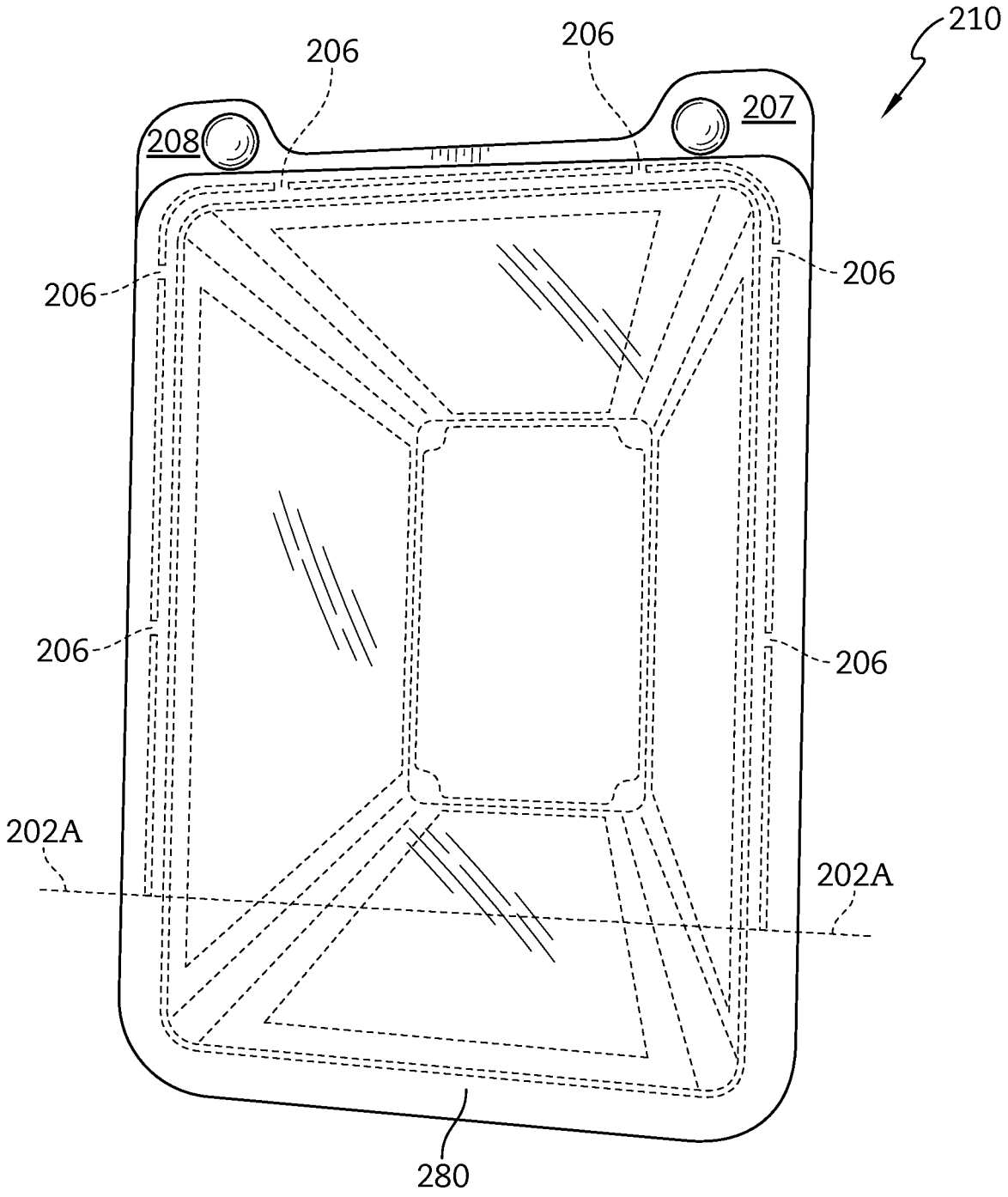
Figure 19:
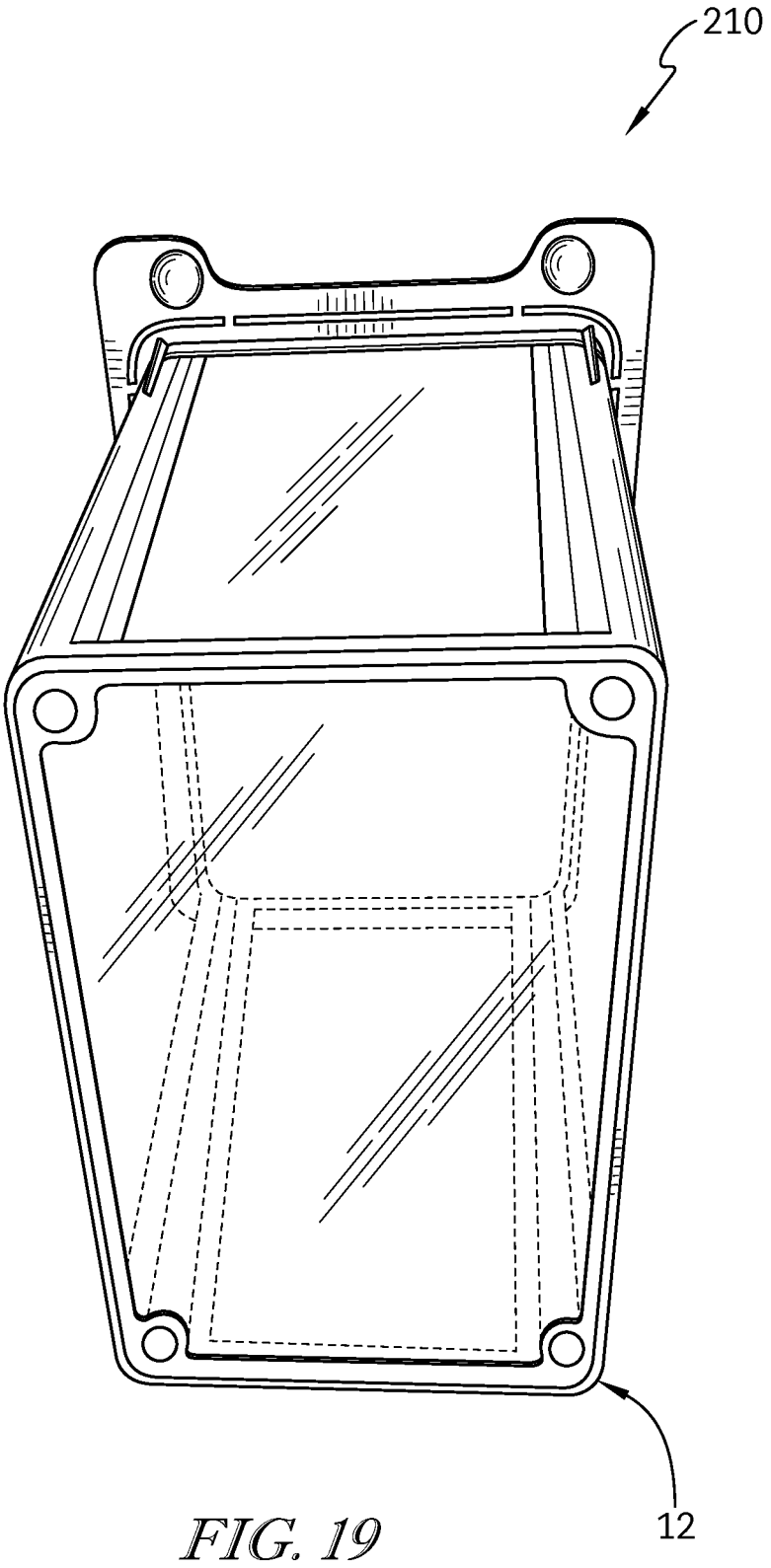
Figure 20:
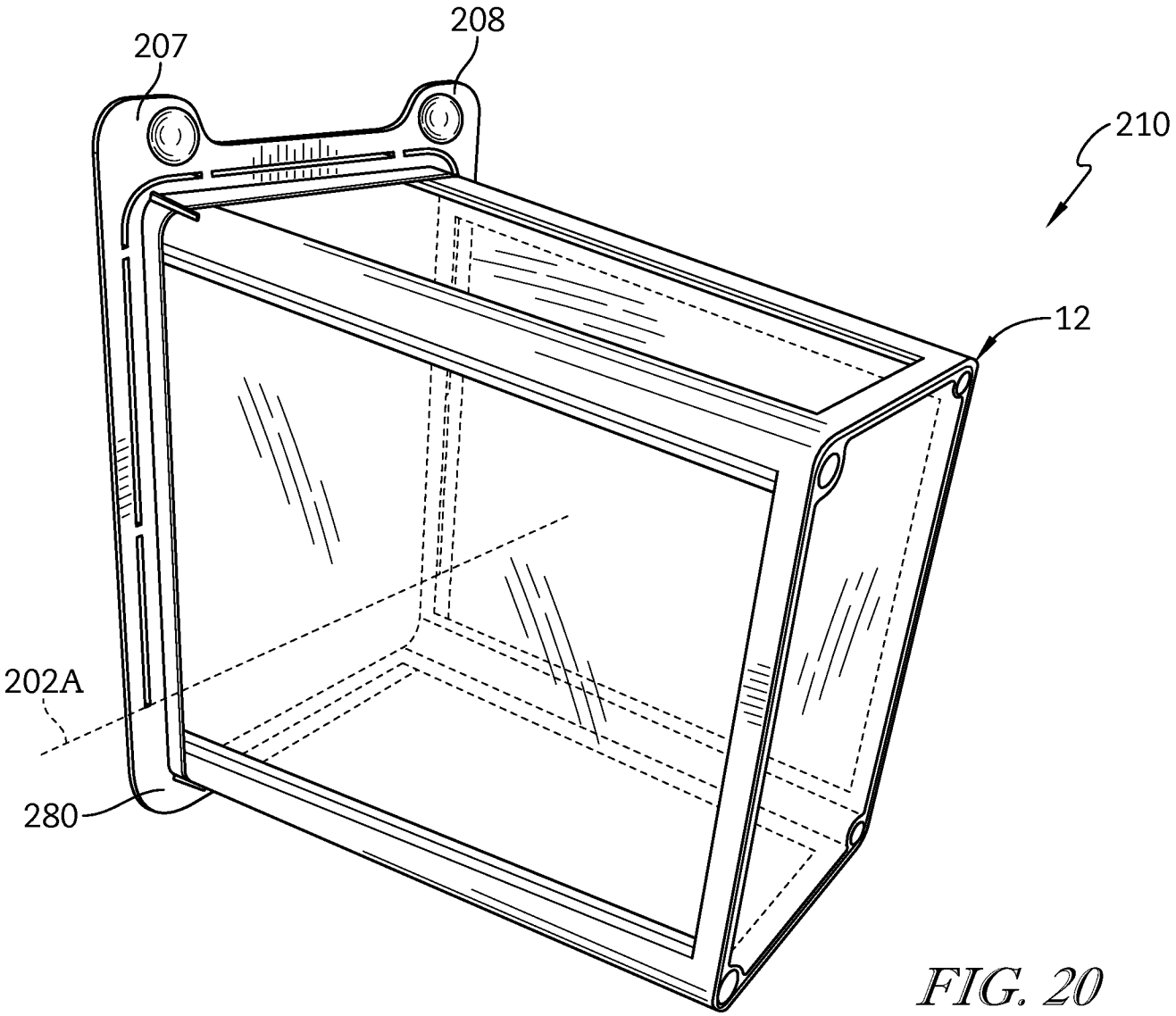
Figure 21:
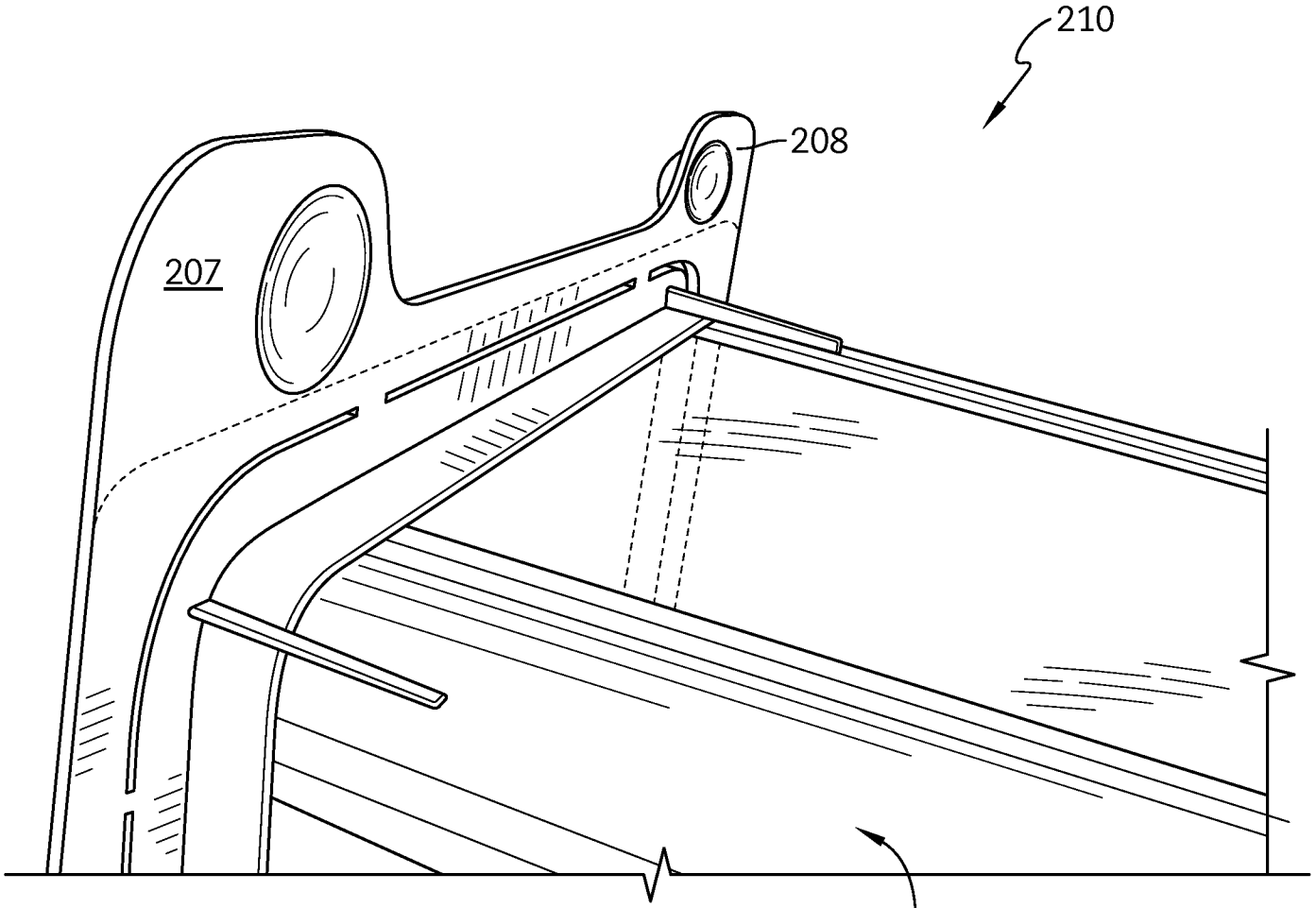
Figure 22:
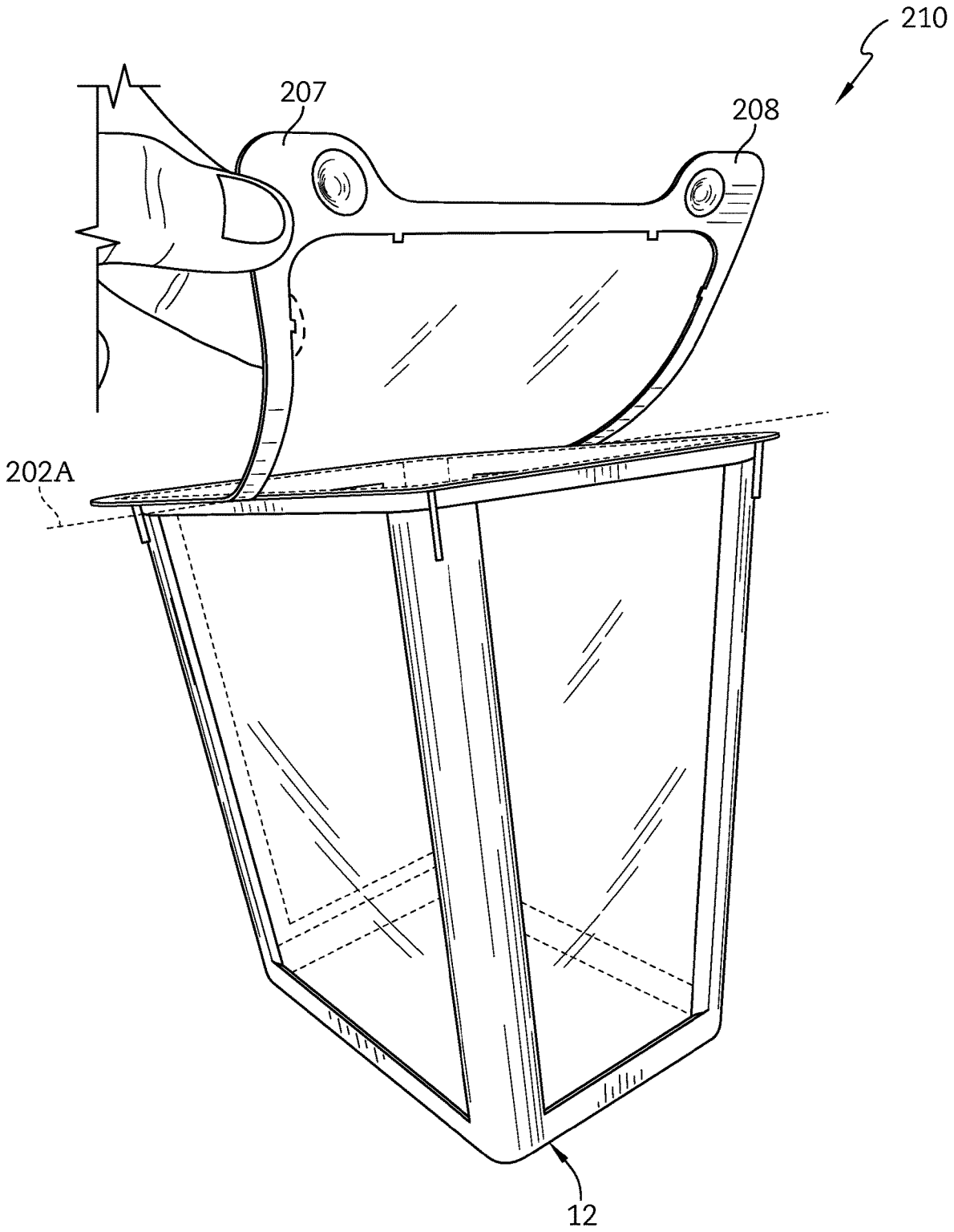
Figure 23:
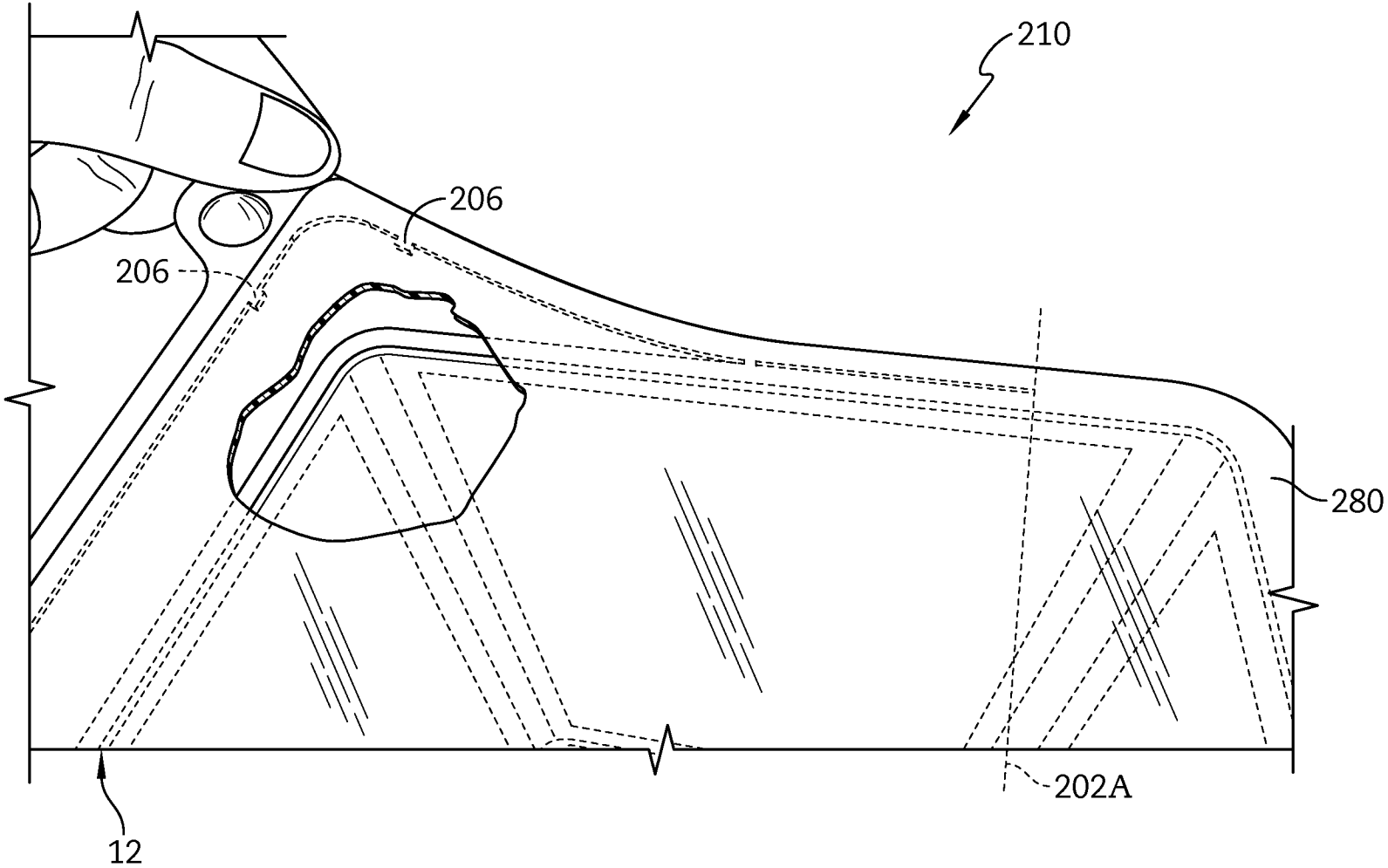

FIG. 6 is an enlarged view taken from the circled region of FIG. 5 showing a portion of the frame and a portion of the side wall included in the interior casing and suggesting that an upwardly facing inner surface of an upper end of the side film panel included in the side wall is arranged to mate with a membrane sheet included in a lid so as to define an interior product-storage region bounded by the interior casing and the membrane sheet of the lid;

FIG. 7 is an enlarged view taken from a first circled region of FIG. 3 showing illustrative dimension of portions of the frame and the interior casing;

FIG. 8 is an enlarged view taken from a second circled region of FIG. 2 showing a lower portion of the frame of the container, a lower portion of the side film panel, and a portion of the bottom film panel;

FIG. 9 is an enlarged view taken from the circled region of FIG. 9 showing that an upwardly extending outer end of the bottom film panel is arranged to overlap a lower portion of the side film panel and lie in a space provided between the lower portion of the side film panel and the frame;

FIG. 10 is an enlarged view taken from a second circled region of FIG. 3 showing illustrative dimensions of portions of the frame and the interior casing;

FIG. 11 is a sectional view taken along line 11-11 of FIGS. 1 and 2 showing that the base section of the frame includes a generally rectangular border strip and a strip rigidifier located at each of the four interior corners of the generally rectangular border strip and coupled to the border strip to lie in an interior region bounded by the border strip;

FIG. 12 is an enlarged view taken from a circled region of FIG. 12;

FIG. 13 is a view similar to FIG. 12 showing various illustrative dimensions of portions of the container;

FIG. 14 is a plan view of a blank used to form the side film panel included in the interior casing of the container;

FIG. 15 is a plan view of a blank used to form the bottom film panel included in the interior casing of the container;

FIGS. 16-23 are a series of photographs of a package in accordance with a second embodiment of the present disclosure;

FIG. 16 is a photograph showing that the container includes an interior casing and a frame and showing that the frame includes, from bottom to top, a rectangular base section, four upright corner columns located at each corner of the container, a brim, and a lid comprising a pivotable U-shaped closure support appended to the brim to pivot about a horizontal pivot axis (when opened as suggested in FIGS. 22 and 23) and a closure coupled to the closure support and to the brim to close a top opening into a product-storage region formed in the container;

FIG. 17 is a photograph of the package of FIG. 16 taken from another perspective showing that a front portion of the U-shaped closure support includes two spaced-apart grip tabs configured to be grasped by a consumer to aid in separating the lid from the container brim to open the package;

FIG. 18 is a photograph of the package of FIGS. 16 and 17 taken from above the container looking downwardly toward the floor of the container;

FIG. 19 is a photograph of the container of FIGS. 16-18 taken from the bottom of the container looking upwardly toward the brim of the container;

FIG. 20 is a photograph of the package of FIGS. 16-19 taken from another perspective;

FIG. 21 is a photograph of a portion of the package of FIGS. 16-20 showing the U-shaped closure support coupled to the brim by two frangible connectors;

FIG. 22 is a photograph showing the closure support being separated from the brim to open the package; and FIG. 23 is a photograph taken from another perspective showing the U-shaped closure support being separated from the brim after breakage of several of the frangible connectors included in the lid and used initially to anchor a front portion of the U-shaped closure support to an adjacent portion of the brim of the container.

DETAILED DESCRIPTION OF THE DRAWINGS

A package 10 in accordance with a first embodiment of the present disclosure includes a container 12 and a lid 14 as suggested in FIGS. 1-4. An interior casing 16 made of bottom and side film panels 16B, 16S is mounted on inner surfaces of an exterior frame 18 to form container 12 as suggested in FIG. 1A. Bottom and side film panels 16B, 16S overlap when assembled as suggested in FIGS. 8 and 9. Lid 14 is adapted to be coupled to a brim 180 of frame 18 as suggested diagrammatically in FIG. 1 and to an upper portion of side film panel 16S as suggested in FIGS. 5 and 6 to close a container 12.

A package 210 in accordance with a second embodiment of the present disclosure is shown in FIGS. 16-23. Lid 214 of package 210 includes a (1) U-shaped closure support 202 mounted on the brim 280 of frame 210 for pivotable movement about a horizontal pivot axis 202A between a closed position shown in FIGS. 16-18 and an opened position shown in FIGS. 22 and 23 and (2) a closure 204 made of film coupled to U-shaped closure support 202 to move therewith and adapted to mate with brim 280 when the U-shaped closure support 202 is in the closed position as suggested in FIG. 16.

Figure 1A:
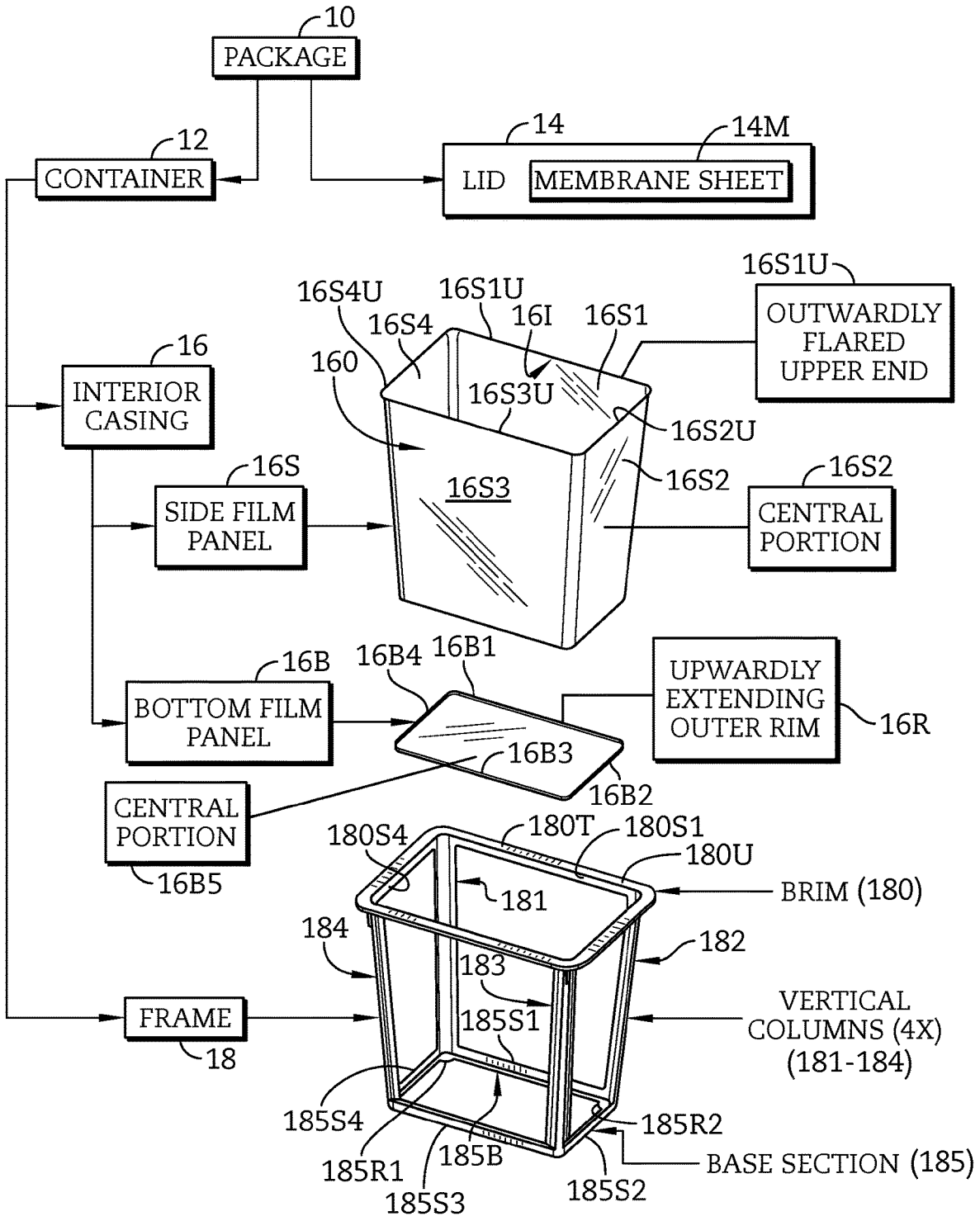

Frame 18 of container 12 includes brim 180, four generally vertical corner columns 181-184, and a base section 185 as shown, for example, in FIG. 1A. Although brim 180 and base section 185 have rectangular shapes as suggested in FIG. 1A, any suitable shape may be used in accordance with the present disclosure. Each corner column 181-184 is arranged to interconnect a corner of brim 180 and a companion corner of base section 185. Brim 180 includes an upwardly facing surface 180U adapted to mate with lid 14 when lid 14 is mounted on container 12 as suggested diagrammatically in FIG. 1. Inner surfaces of brim 180, corner columns 181-184, and base section 185 are arranged to mate with outer surfaces of bottom and side film panels 16B, 16S when interior casing 16 is mounted on frame 18 at a factory to form container 12. Frame 18 is a monolithic component made of a plastic material and is overmolded onto interior casing 16 in any suitable manner in illustrative embodiments.

Brim 180 of container frame 18 includes an upwardly facing endless top strip 180T as shown in FIGS. 1 and 1A. Brim 180 also includes four downwardly extending side members 180S1, 180S2, 180S3, and 180S4 appended to the underside of top strip 180T. Each side member of brim 180 is arranged to interconnect two adjacent corner columns of frame 18 as suggested in FIG. 1. For example, side member 180S1 interconnects corner columns 181 and 182 and side member 180S2 interconnects corner columns 182 and 183.

Base section 185 of container frame 18 includes an endless border strip 185B as shown in FIGS. 1A and 11. Base section 185 also includes four upwardly extending side members 185S1, 185S2, 185S3, and 185S4 appended to the topside of border strip 185B. Each side member of base section 185 is arranged to interconnect two adjacent corner columns of frame 18 as suggested in FIG. 1A. For example, side member 185S3 interconnects corner columns 183 and 184 and side member 185S4 interconnects corner columns 184 and 181. As suggested in FIG. 11, border strip 185B has a generally rectangular shape and a strip rigidifier 185R1, 185R2, 185R3, or 185R4 is located at each of the four interior corners of the generally rectangular border strip 185B and coupled to border strip 185B to lie in an interior region bounded by border strip 185B.

First corner column 181 of container frame 18 has an upper end coupled to a first corner of brim 180 and a lower end coupled to a first corner of base section 185 as suggested in FIG. 1A. In an illustrative embodiment, first corner column 181 includes a first post 181P1 arranged to interconnect side member 185S4 of base section 185 and side member 180S4 of brim 180, a third post 181P3 arranged to interconnect side member 185S1 of base section 185 and side member 180S1 of brim 180, and a second post 181P2 arranged to interconnect border strip 185B of base section 185 and top strip 180T of brim 180. Second post 181P2 is arranged to lie between and interconnect first and third posts 181P1, 181P3. The thickness of the first and third posts 181P1, 181P3 is less than the thickness of the second post 181P2 to provide means for minimizing wrinkling of side film panel 16S of interior casing 16 during overmolding of frame 18 onto interior casing 16. Such a variation in post thickness also applies to the other corner columns 182-184 in accordance with the present disclosure.

Second corner column 182 of container frame 18 has an upper end coupled to a second corner of brim 180 and a lower end coupled to a second corner of base section 185 as suggested in FIG. 1A. In an illustrative embodiment, second corner column 182 includes a first post 182P1 arranged to interconnect side member 185S2 of base section 185 and side member 180S2 of brim 180, a third post 182P3 arranged to interconnect side member 185S1 of base section and side member 180S1 of brim 180, and a second post 182P2 arranged to interconnect border strip 185B of base section 185 and top strip 180T of brim 180. Second post 182P2 is arranged to lie between and interconnect first and third posts 182P1, 182P3.

Third corner column 183 of container frame 18 has an upper end coupled to a third corner of brim 180 and a lower end coupled to a third corner of base section 185 as suggested in FIG. 1A. In an illustrative embodiment, third corner column 183 includes a first post 183P1 arranged to interconnect side member 185S2 of base section 185 and side member 180S2 of brim 180, a third post 183P3 arranged to interconnect side member 185S3 of base section 185 and side member 180S3 of brim 180, and a second post 183P2 arranged to interconnect border strip 185B of base section 185 and top strip 180T of brim 180. Second post 183P2 is arranged to lie between and interconnect first and third posts 183P1, 183P3.

Fourth corner column 184 of container frame 18 has an upper end coupled to a fourth corner of brim 180 and a lower end coupled to a fourth corner of base section 185 as suggested in FIG. 1A. In an illustrative embodiment, fourth corner column 184 includes a first post 184P1 arranged to interconnect side member 185S4 of base section 185 and side member 180S4 of brim 180, a third post 184P3 arranged to interconnect side member 185S3 of base section 185 and side member 180S3 of brim 180, and a second post 184P2 arranged to interconnect border strip 185B of base section 185 and top strip 180T of brim 180. Second post 184P2 is arranged to lie between and interconnect first and third posts 184P1, 184P3.

Bottom film panel 16B of interior casing 16 is coupled to base section 185 of frame 18 and lower portions of corner columns 181-184 to establish a floor of container 12 as suggested in FIGS. 1A, 8, and 9. In illustrative embodiments, bottom film panel 16B is coupled to inner surfaces of border strip 185B, strip rigidifiers 185R1-4, and side members 185S1-4. Bottom film panel 16B includes a central portion 16B5 and an upright rim 16R comprising a series of four upwardly extending rim portions 16B1-16B4 as shown, for example, in FIG. 1A. In illustrative embodiments, rim portions 16B1-16B4 cooperate to form an endless rim 16R. Bottom film panel 16B is made of any suitable single or multilayer plastic material in illustrative embodiments of the present disclosure.

Side film panel 16S of interior casing 16 is coupled to brim 180 of frame 18 and to upper portions of corner columns 181-184 and upwardly extending rim portions 16B1-16B4 of bottom film panel 16B to establish a side wall of container 12 as suggested in FIGS. 1A, 5, and 6. In illustrative embodiments side film panel 16S is coupled to an outer surface of top strip 180T of brim 180 and inner surfaces of corner columns 181-184. Lower portions of side film panel 16S are also arranged to mate with and overlap upwardly extending rim portions of 16B1-16B4 of bottom film panel 16B and to lie in spaced-apart relations to interior surfaces of side members 185S1-S4 of base section 185 to trap the upwardly extending rim portions 16B1-16B4 of bottom film panel 16B there between. Side film panel 16S is made of any suitable single or multilayer plastics material in illustrative embodiments of the present disclosure.

Side film panel 16S includes a series of four panel sections 16S1-16S4 as suggested in FIG. 1A. Each panel section 16S1-4 includes an outer surface 160 arranged to face toward the four corner columns 191-194 and an inner surface 161 arranged to face away from the corner columns 181-184 as suggested in FIG. 1. Each panel section 16S1-4 includes an upper end 16S1U-4U that is flared outwardly as suggested in FIG. 1A and the outwardly flared upper end 16S4U of fourth panel section 16S4 is shown in more detail in FIGS. 5 and 6 and is representative of the shape and configuration of outwardly flared upper ends 16S1U-3U.

In illustrative embodiments, interior casing 16 is arranged to lie in an interior space bounded by base section 185 and four upright corner columns 181-184 as suggested in FIGS. 1 and 1A. A central portion 16B5 of bottom film panel 16B is coupled to upwardly facing surfaces of base section 185 included in container 12. A central portion of side film panel 16S is coupled to inwardly facing surfaces of upright corner columns 181-184 included in container 12. Together, four panel sections 16S1-16S4 cooperate to provide the central portion of the side wall panel 16S.

In illustrative embodiments, an upper end 16S1U-16S4U of side film panel 16S is flared outwardly so that an outer surface of that upper end faces downwardly to mate with brim 180 of container 12 and an inner surface of that upper end faces upwardly to mate with a lid 14 that is configured to be mounted on brim 180 to close a top aperture opening into an interior product-storage region bounded by interior casing 16.

In illustrative embodiments, an upwardly extending outer rim 16R of bottom film panel 16B is mated with a lower portion of the upright corner columns 181-184 of frame 18. A downwardly extending lower portion of side film panel 16S is arranged to lie in spaced-apart relation to the lower portion of upright corner columns 181-184 of frame 18 to trap the upwardly extending outer rim 16R of bottom film panel 16B therebetween so as to overlap with the upwardly extending outer end of the side film panel 16S.

In illustrative embodiments, container 12 comprises a box-like interior casing 16 made of a thin film reinforced by a rigid injection-molded frame 18 made of a plastics material. Containers 12 are nestable to minimize pre-filled shipping volumes and are rectangular and stackable to maximize post-filled shelf densities.

Interior casing 16 comprises a side film panel 16S and a bottom film panel 16B that overlaps a lower portion of side film panel 16S at the edges to maintain barrier integrity. Frame 18 is overmolded onto interior casing 16 to add strength and rigidity to container 12 as well as to bond and affix the joints and edges of side and bottom film panels 16S, 16B. In illustrative embodiments, the vertical seam of the endless side film panel 16S is located behind on of the four corner columns 181-184 to hide and protect the seam and to hold the edges in intimate contact to maximize barrier integrity.

In one example, side film panel 16S is a separate component from bottom film panel 16 as suggested in FIG. 1A. In another example, the side film panel and the bottom film panel may be a monolithic component.

In another example where the interior casing is a monolithic component, bottom wall panel may be quadrilateral in shape and the side wall panel may comprise four separate panel portions spaced apart from one another and coupled to a different side of the bottom wall panel. As a result, the interior casing may have a generally plus-sign shape. During container manufacturing, each panel portion is arranged to overlap a portion of the neighboring panel at an associated upright column. Any suitable number of sides and shapes and panel portions may be used.

Lid 14 comprises a membrane sheet 14M defined by a multilayer film structure that is heat sealed to brim 180 of container 12. Membrane sheet 14M has barrier properties selected to match barrier properties of side and bottom film panels 16S, 16B and includes a peel layer to make it easily removable by a consumer. An overmolded sheet-support frame made of plastic material can be used to surround and support membrane sheet 14M in illustrative embodiments. Peelable and resealable films can also be used to form a membrane sheet to provide a multi-use lid. An alternative illustrative hinged lid 214 having an integrated bail-brim system is disclosed in the embodiment shown in FIGS. 16-23.

In another example, a lid in accordance with the present disclosure may omit a membrane sheet or film component and be formed from a barrier material. In one example, the lid may be injection molded. The lid may be coupled by a snap-fit coupling to the brim of the container and may engage and couple to the upwardly facing surface of the brim and the upper end of the side film panel. The lid may couple to the upwardly facing surface of the brim and the upper end of the side film panel by a heat seal, a pressure sensitive adhesive, or any other suitable alternative or combination thereof.

In illustrative embodiments, a pre-printed sheet of film material is cut in any suitable manner to produce side and bottom film panels 16S, 16B. Side and bottom film panels 16S, 16B are placed on a mold core. Bottom film panel 16B overhangs to create an overlapping engagement with a lower portion of side film panel 16S. Frame 18 is overmolded onto interior casing 16 in a closed mold including the mold core.

Film portions and the frame are affixed and bonded to one another during overmolding. In one illustrative example, the frame is formed by injection molding hot liquid plastics material which interacts with the film portions to cause melting and intermixing at the areas of affixing and bonding.

Once formed, container 12 is filled with a product while container 12 is held in a sealing nest that supports brim 180 of frame 18. Lid 14 is then placed on top of the filled container and oriented properly. Lid 14 is then heat-sealed to another lid 14 to brim 180 and to the upwardly facing flared portion of side film panel 16S.

In illustrative embodiments, frame 18 is made of a polypropylene material. Any suitable film material may be used to form interior casing 16. In illustrative embodiments, the film thickness is about three mil or about four mil and between about 2 mil and about 5 mil.

A package 210 in accordance with a second embodiment of the present disclosure is shown in FIGS. 16-23. Package 210 includes a container 212 and a lid 214. Container 212 is the same as container 12 except that it has a brim 280 that has a shape different than brim 180 of container 12.

Lid 214 includes a U-shaped closure support 202 that is mounted on brim 280 of frame 218 for pivotable movement about a horizontal pivot axis 202A between a closed position shown in FIGS. 16-18 and an opened position shown in FIGS. 22 and 23. A closure 204 made of film is coupled to U-shaped closure support 202 to move therewith relative to frame 218 and is adapted to mate with brim 280 when U-shaped closure support 202 is in the closed position suggested in FIG. 16.

As suggested in FIG. 18, several frangible connectors 206 are included in lid 214 and formed to retain U-shaped closure support 202 of lid 214 in the closed position alongside brim 280 of container 212 until the lid 214 is opened for the first time by a consumer. A front portion of U-shaped closure support 202 includes two spaced-apart grip tabs 207, 208 configured to be grasped by a consumer to aid in separating lid 214 from container brim 280 to open package 210.

Closure 204 is a membrane sheet that is heat-sealed to U-shaped closure support 202 and to brim 280. To open package 210, a consumer opens lid 214 by lifting up on tabs 207, 208 provided a front corners of U-shaped closure support 202. This separation breaks the frangible connectors 206 and fractures the membrane sheet providing closure 204 over the inner brim area. U-shaped closure support 202 and closure 204 cooperate to form a flip-top lid 214 pivotable about hinge axis 202A.

The invention claimed is:

[1. A package comprising a container including an interior casing including a side film panel and a bottom film panel coupled together and a frame including a base section coupled to the bottom film panel to form a floor of the container, a brim arranged to lie in spaced-apart relation above the base section, and upright columns arranged to extend between and interconnect the brim and the base section and coupled to the side film panel to form a side wall of the container and a lid coupled to the container to mate with the brim and close selectively a top aperture formed in the container and arranged to open into the interior product-storage region, wherein an upper end of the side film panel is flared outwardly so that an outer surface of that upper end faces downwardly to mate with the brim of the container and an inner surface of the upper end faces upwardly to mate with the lid, wherein the lid includes a closure support coupled to the brim to move relative to the brim and a membrane sheet coupled to an upwardly facing surface of the closure support and to an upwardly facing surface of the brim to cause the membrane sheet to trap the upper end of the side film panel between a portion of the upwardly facing surface of the brim and the membrane sheet so as to overlap with the upper end of the side film panel.]

[2. The package of claim 1, wherein an upwardly extending outer end of the bottom film panel is mated with a lower portion of the upright columns of the frame and a downwardly extending lower portion of the side film panel is arranged to lie in spaced-apart relation to the lower portion of the upright columns of the frame to trap the upwardly extending outer end of the bottom film panel therebetween so as to overlap with the upwardly extending outer end of the bottom film panel.]

[3. The package of claim 2, wherein the side film panel includes a first end arranged to extend between and interconnect the brim and the base section of the frame, a second end spaced apart from the first end and arranged to extend between and interconnect the brim and the base section of the frame, and the first end is arranged to overlie the second end to locate the first end between the second end and the interior product-storage region.]

[4. The package of claim 3, the first end is coupled to one of the upright columns, the second end is coupled to the first end to trap the first end between the second end and the upright column and overlap with the first end of the side film panel.]

[5. The package of claim 1, wherein a downwardly extending lower portion of the side film panel is mated with a lower portion of the upright columns of the frame and an upwardly extending outer end of the bottom film panel is arranged to lie in spaced-apart relation to the lower portion of the upright columns of the frame to trap the downwardly extending lower portion of the side film panel therebetween so as to overlap with the downwardly extending lower portion of the side film panel.]

[6. The package of claim 1, wherein closure support is coupled to the brim to pivot relative to the brim.]

[7. The package of claim 1, wherein an upwardly extending outer end of the bottom film panel is mated with a lower portion of the upright columns of the frame and a downwardly extending lower portion of the side film panel is arranged to lie in spaced-apart relation to the lower portion of the upright columns of the frame to trap an upwardly extending outer end of the bottom film panel therebetween so as to overlap with the upwardly extending outer end of the bottom film panel.]

[8. The package of claim 1, wherein the side film panel includes a first end arranged to extend between and interconnect the brim and the base section of the frame, a second end spaced apart from the first end and arranged to extend between and interconnect the brim and the base section of the frame, and the first end is coupled to one of the upright columns, the second end is coupled to the first end to trap the first end between the second end and the upright column and overlap with the first end of the side film panel.]

[9. The package of claim 1, wherein interior casing defines the interior product-storage region.]

[10. The package of claim 9, wherein the frame is overmolded onto the side and bottom film panels that form the interior casing.]

[11. The package of claim 9, wherein the frame surrounds and rigidifies the interior casing.]

[12. The package of claim 9, wherein the interior casing is arranged to lie in an interior space bounded by the base section and the upright columns.]

[13. The package of claim 1, wherein a central portion of the side film panel is coupled to inwardly facing surfaces of the upright columns included in the container.]

[14. The package of claim 1, wherein an upwardly extending outer end of the bottom film panel is mated with a lower portion of the upright columns of the frame.]

[15. The package of claim 1, wherein the lid includes a pivotable U-shaped closure support coupled to the brim to pivot about a horizontal pivot axis and a closure coupled to an upwardly facing surface of the pivotable U-shaped closure support.]

[16. The package of claim 15, wherein the closure is coupled to an upwardly facing surface of the brim.]

17. A package comprising a container including [an interior] *a* casing including a side film panel and a bottom film panel [coupled together] *separate from the side film panel* and a frame including a base section coupled to the bottom film panel to form a floor of the container, a brim arranged to lie in spaced-apart relation above the base section, and upright columns arranged to extend between and interconnect the brim and the base section and coupled to the side film panel to form a side wall of the container and a lid coupled to the container to mate with the brim and close selectively a top aperture formed in the container and arranged to open into [the] *an* interior product-storage region *of the container*, wherein the lid includes a [pivotable U-shaped] closure support *and is* coupled to the brim to pivot about a horizontal pivot axis [and a closure coupled to an upwardly facing surface of the pivotable U-shaped closure support, wherein the closure is coupled to an upwardly facing surface of the brim] *from a closed position to an opened position*, wherein the lid further includes frangible connectors arranged to extend between and interconnect [an outer edge of] the brim and [an inner edge of] the [U-shaped] closure support, *and*

*wherein the lid is configured to be peeled away from the brim to open the top aperture of the container.*

18. The package of claim [17] *27*, wherein *the* frangible connectors break in response to application of a pivot-inducing lifting force to an underside of the [U-shaped closure support] *lid* to cause [a portion of the closure] *the lid* to separate from *at least* a portion of the brim.

19. The package of claim 18, wherein the [closure is] *lid includes* a film panel.

20. A container comprising an interior casing including a side film panel and a bottom film panel coupled together and a frame including a base section coupled to the bottom film panel to form a floor of the container, a brim arranged to lie above the base section, and a plurality of upright columns arranged to extend between and interconnect the brim and the base section and coupled to the side film panel to form a side wall of the container, wherein the frame further includes a closure support coupled to the brim to move relative to brim and frangible connectors arranged to extend between and interconnect an outer edge of the brim and an inner edge of the closure support.

21. The container of claim 20, wherein the frame is overmolded onto the side and bottom film panels to rigidify the interior casing and cause the interior casing to define an interior product-storage region formed in the container and the interior casing is arranged to lie in an interior space bounded by the base section and upright columns.

22. The container of claim 20, wherein an upwardly extending outer end of the bottom film panel is mated with a lower portion of the upright columns of the frame.

23. The container of claim 22, wherein a downwardly extending lower portion of the side film panel is arranged to lie in spaced-apart relation to the lower portion of the upright columns of the frame to trap the upwardly extending outer end of the bottom film panel therebetween so as to overlap with the upwardly extending outer end of the bottom film panel.

24. The container of claim 23, wherein an upper end of the side film panel is flared outwardly so that an outer surface of that upper end faces downwardly to mate with the brim of the container and an inner surface of the upper end faces upwardly away from the brim.

25. The container of claim 24, wherein an upwardly extending outer end of the bottom film panel is mated with a lower portion of the upright columns of the frame and a downwardly extending lower portion of the side film panel is arranged to lie in spaced-apart relation to the lower portion of the upright columns of the frame to trap the upwardly extending outer end of the bottom film panel therebetween so as to overlap with the upwardly extending outer end of the bottom film panel.

26. The container of claim 20, wherein frangible connectors break in response to application of a lifting force to an underside of the closure support to cause a portion of the closure support to separate from a portion of the brim.

*27. The package of claim 17, wherein the frangible connectors are coupled to an outer edge of the brim.*

* * * * *